US012601340B2

(12) United States Patent
Gebauer et al.

(10) Patent No.: US 12,601,340 B2
(45) Date of Patent: Apr. 14, 2026

(54) DIAPHRAGM PUMP

(71) Applicant: Cytiva Sweden AB, Uppsala (SE)

(72) Inventors: Klaus Gebauer, Uppsala (SE);
Andreas Lundin, Uppsala (SE);
Andreas Marcstrom, Uppsala (SE);
David Gronowitz, Uppsala (SE); **Bjorn
Johansson, Uppsala (SE); Mats
Nilsson, Uppsala (SE); Bjorn
Olovsson**, Uppsala (SE)

(73) Assignee: Cytiva Sweden AB, Uppsala (SE)

( * ) Notice: Subject to any disclaimer, the term of this
patent is extended or adjusted under 35
U.S.C. 154(b) by 128 days.

(21) Appl. No.: 17/634,455

(22) PCT Filed: Jun. 24, 2020

(86) PCT No.: PCT/EP2020/067614
§ 371 (c)(1),
(2) Date: Feb. 10, 2022

(87) PCT Pub. No.: WO2021/032341
PCT Pub. Date: Feb. 25, 2021

(65) Prior Publication Data
US 2022/0275798 A1 Sep. 1, 2022

(30) Foreign Application Priority Data

Aug. 22, 2019 (GB) ..................................... 1912057

(51) Int. Cl.
*F04B 43/02* (2006.01)
*F04B 43/00* (2006.01)
(Continued)

(52) U.S. Cl.
CPC ........ *F04B 43/026* (2013.01); *F04B 43/0045*
(2013.01); *F04B 43/0054* (2013.01);
(Continued)

(58) Field of Classification Search
CPC ...... F16K 15/148; F04B 43/026; F04B 43/04;
F04B 43/0045; F04B 53/1065;
(Continued)

(56) References Cited

U.S. PATENT DOCUMENTS 4,153,391 A * 5/1979 Hartley ................. F04B 43/026
417/269
5,649,812 A 7/1997 Schoenmeyr
(Continued)

FOREIGN PATENT DOCUMENTS

CN 201265516 Y 7/2009
CN 102032153 A 4/2011
(Continued)

OTHER PUBLICATIONS

CN Office Action and Search Report for CN Application No.
202080058919.X, Dated Oct. 31, 2023 (22 pages).
(Continued)

*Primary Examiner* — Peter J Bertheaud
(74) *Attorney, Agent, or Firm* — Eversheds-Sutherland
(US) LLP

(57) ABSTRACT

A diaphragm pump for a bioprocess system comprises a
pump head (1; 101; 201; 301) comprising: a common inlet
(3); a common outlet (5); a plurality of pump cavities (7)
each including at least one cooperating pair of one-way
valves, the at least one pair of one-way valves including an
inlet valve (9) and an outlet valve (11), wherein the respec-
tive inlet valves (9) are in fluid communication with the
common inlet (3) and the respective outlet valves (11) are in
fluid communication with the common outlet (5) and
wherein a centre of the outlet valve (11) for each pump
cavity is positionable above a centre of the inlet valve (9) for
the same pump cavity when the diaphragm pump is oriented
for use to inhibit trapped gas; and a plurality of moveable (Continued)

diaphragms (13) each respectively provided in a respective of said pump cavities (7) for varying a volume of the pump cavities. The system further comprises a pump drive (31) which is configured to transfer a motion to the diaphragms (13) of the pump head (1; 101; 201) for accomplishing a fluid displacement from the common inlet (3) to the common outlet (5) of the pump head (1; 101; 201; 301) as a result of said varying of the volume of the pump cavities (7).

44 Claims, 33 Drawing Sheets

(51) Int. Cl.

| | |
|---|---|
| *F04B 43/04* | (2006.01) |
| *F04B 45/04* | (2006.01) |
| *F04B 45/047* | (2006.01) |
| *F04B 53/10* | (2006.01) |
| *F16K 15/14* | (2006.01) |

(52) U.S. Cl.
CPC .............. *F04B 43/02* (2013.01); *F04B 43/04* (2013.01); *F04B 45/04* (2013.01); *F04B 45/043* (2013.01); *F04B 45/047* (2013.01); *F04B 53/1065* (2013.01); *F16K 15/148* (2013.01); *F04B 53/108* (2013.01)

(58) Field of Classification Search
CPC .... F04B 45/047; F04B 23/06; F04B 43/0054; F04B 43/02; F04B 45/043; F04B 45/04
See application file for complete search history.

(56) References Cited

U.S. PATENT DOCUMENTS

| | | | |
|---|---|---|---|
| 5,927,956 A | 7/1999 | Lim et al. | |
| 6,299,414 B1 | 10/2001 | Schoenmeyr | |
| 6,746,637 B1 * | 6/2004 | Huss ....................... | B29C 45/16 |
| | | | 264/250 |
| 10,082,138 B2 * | 9/2018 | Han .................... | F04B 53/1065 |

| | | | |
|---|---|---|---|
| 2011/0070107 A1 | 3/2011 | Meza | |
| 2014/0044563 A1 | 2/2014 | Wylie et al. | |
| 2016/0082168 A1 | 3/2016 | Zhu et al. | |
| 2018/0142684 A1 | 5/2018 | Abel et al. | |
| 2018/0320681 A1 | 11/2018 | Chang | |

FOREIGN PATENT DOCUMENTS

| | | | |
|---|---|---|---|
| CN | 104791228 A | 7/2015 | |
| CN | 204437387 U | 7/2015 | |
| CN | 107218400 A | 9/2017 | |
| DE | 106451 A1 | 12/1974 | |
| DE | 202006020237 U1 | 2/2008 | |
| DE | 102008035592 A1 | 4/2010 | |
| DE | 102016111987 A1 | 4/2018 | |
| EP | 1308622 A2 | 5/2003 | |
| EP | 2306017 A1 | 6/2011 | |
| EP | 2696074 A1 | 12/2014 | |
| GB | 2315820 A | 11/1998 | |
| JP | 2000-154782 A | 6/2000 | |
| JP | 2004-211584 A | 7/2004 | |
| JP | 2005-264777 A | 9/2005 | |
| JP | 2011-069369 A | 4/2011 | |
| JP | 2011-027134 A | 7/2011 | |
| JP | 2017-505405 A | 2/2017 | |
| KR | 1020120002350 A | 1/2012 | |
| WO | 2015/119717 A1 | 8/2015 | |
| WO | 2017139727 A1 | 8/2017 | |
| WO | 2018002030 A1 | 1/2018 | |
| WO | 2019197047 A1 | 10/2019 | |

OTHER PUBLICATIONS

PCT International Search Report and Written Opinion for PCT/EP2020/067/614 mailed Nov. 3, 2020 (19 pages).

Great Britain Search Report for GB Application No. 1912057.5 mailed Feb. 13, 2020 (3 pages).

Extended European Search Report for EP Application No. 24157432.6, dated Mar. 11, 2024 (15 pages).

Japanese Office Action JP Application No. 2022-511331, dated Feb. 5, 2024 (15 pages).

* cited by examiner

121

125

123

201

11

9

13

28

27

1; 101; 201

1; 101; 201

9a,11a 9c,11c

90c 9d,11d

90d 61a,61b

9',11'

9",11"

Conical
9b,11b 9,11

9",11"

9',11'

9,11

DIAPHRAGM PUMP

CROSS REFERENCE TO RELATED APPLICATIONS

This application claims the priority benefit of PCT/EP2020/067614, filed on Jun. 24, 2020, which claims the priority benefit to GB Application No. 1912057.5, filed on Aug. 22, 2019, the entire contents of which are incorporated herein by reference.

FIELD OF THE INVENTION

The present invention relates to a diaphragm pump, a pump head of a diaphragm pump, a single use flow path assembly for a bioprocess system, a one-way valve configured to be used in a diaphragm pump, a movable diaphragm (13) configured to be used in a diaphragm pump, a quick-connect fastener configured to be used in a diaphragm pump and to a bioprocess system.

BACKGROUND OF THE INVENTION

Fluid transfer in bioprocessing, as for example accomplished by instrumentation and systems for transfer and processing of fluid in cell culture, separation, purification, filling, sampling and analysis, does require a wide range of flows with precise control over volumetric accuracy and fluid pressure. Many applications and processing steps require also minimal fluctuations in flow and/or pressure. Positive displacement pumps typically provide the flow range required for bioprocessing, but at the expense of pressure pulsation in their output. Rotating element pumps provide generally consistent pressure, but their flow range is limited, high pressures are difficult to achieve without multiple pump stages, and they may have an adverse impact on the drug substance. Multiple pumps which work together to even out pressure pulses are known, but for lower cost, and for minimized holdup volume in the process, a single pump would be more desirable. Also, a single pump would be easier to control, maintain and keep clean, especially for hygienic, aseptic or sterile processing. A single pump is also preferable for single-use processing equipment, where components in fluid contact are replaced after use to eliminate the need and risk of equipment cleaning.

Diaphragm pumps have certain advantages in use in the biological processing field, for example they do not impose high shear forces on the pumped fluids, which is preferred for pumping fluids containing, for example, cells, proteins and viruses. Such pumps have a reasonable range of flow rates and pressures also. Multiple cavity diaphragm pumps have been proposed, for example, as available commercially under the brand of Quattroflow™ where parallel cavities are driven by a swash plate. One problem in some pumps may be air trapping.

In US20180142684 a multiple cavity diaphragm pump is described and the problem of venting and draining is discussed and tried to be solved. In this device the outlet openings of the outlet valve surround the inlet opening of the inlet valve or vice versa. For example, some outlet openings are provided at high positions of the chamber to support venting and other outlet openings are provided at low positions to support draining. However, all these outlet openings are covered by one and the same check valve. Hereby opening and closing of the different outlet openings for venting and draining cannot be separately controlled. It cannot be assured that the upper part of the valve is opened, especially at low flow rates. At low flow rates only a part of the valve will open up and if this is the lower part of the valve air will not escape properly. A high flow rate may hereby be needed for assuring venting of the pump.

SUMMARY

An object of the present invention is to provide an improved diaphragm pump.

A further object of the invention is to provide a diaphragm pump with reduced tendency to trap air.

A further object of the invention is to provide a pump which has low pulsation.

This is achieved by a diaphragm pump, a pump head, a single use flow path assembly for a bioprocess system and a bioprocess system according to the independent claims.

According to one aspect of the invention a diaphragm pump is provided comprising:
- a pump head comprising:
  - a common inlet;
  - a common outlet;
  - plural pump cavities each including at least one cooperating pair of one-way valves, the at least one pair including an inlet valve and an outlet valve, wherein the respective inlet valves are in fluid communication with the common inlet and the respective outlet valves are in fluid communication with the common outlet and wherein a centre of the outlet valve for each pump cavity is positionable above a centre of the inlet valve for the same pump cavity when the diaphragm pump is oriented for use to inhibit trapped gas; and
  - moveable diaphragms provided in said pump cavities for varying a volume of the pump cavities;
- a pump drive which is configured to transfer a motion to the diaphragms of the pump head for accomplishing a fluid displacement from the common inlet to the common outlet of the pump head as a result of said varying of the volume of the pump cavities.

According to another aspect of the invention a pump head is provided, which is configured to be used connected to a pump drive of a diaphragm pump, said pump head comprising:
- a common inlet;
- a common outlet;
- plural pump cavities each including at least one cooperating pair of one-way valves, the at least one pair including an inlet valve and an outlet valve, wherein the respective inlet valves are in fluid communication with the common inlet and the respective outlet valves are in fluid communication with the common outlet and wherein a centre of the outlet valve for each pump cavity is positionable above a centre of the inlet valve for the same pump cavity when the diaphragm pump is oriented for use to inhibit trapped gas; and
- moveable diaphragms provided in said pump cavities for varying a volume of the pump cavities.

According to another aspect of the invention a single use flow path assembly for a bioprocess system is provided, said single use flow path assembly comprising a pump head as described above connected to a single use flow path.

According to another aspect of the invention a bioprocess system comprising a diaphragm pump as described above is provided.

Hereby a diaphragm pump having high accuracy and linearity is provided and which is fully purgeable also at low flow rates. By providing the outlet valve above the inlet valve in each pump cavity air will not get trapped inside the pump. Sanitization is hereby greatly improved as all internal surfaces in the pump cavities are fully wetted, even when using low flow rates and low back pressure.

Furthermore, a diaphragm pump which is suitable for single use applications is provided. Furthermore, a cost efficient and scalable diaphragm pump is achieved.

In one embodiment of the invention the inlet and outlet valves include flexible valve disks, each disk including a generally central retaining stem for holding the valve disk in place.

In one embodiment of the invention the pump head further comprises a pivot device provided to a centre of a diaphragm engagement plate of the pump head for providing a pivot point to the centre of the diaphragm engagement plate. Hereby it is assured that the diaphragm engagement plate which is engaging the diaphragms of the pump head always will pivot around its centre and hereby the diaphragms will be both effectively pushed and retracted and hereby a complete filling of the pump cavities can be provided even at high motor frequency and when fluid inlet pressure is low, for example when fluid sources are placed at low positions in relation to the pump.

In one embodiment of the invention the pump head further comprises at least one leakage collector which is a flexible bellow surrounding the pump cavities and diaphragms and which is configured to collect possible leakage from the pump cavities.

Further embodiments are described in the detailed description and in the dependent claims.

However, the invention extends to any combination of features disclosed herein, whether or not such a combination is described or claimed explicitly herein. Further, where two or more features are mentioned herein in combination, it is intended that such features may be claimed separately without extending the scope of the invention.

BRIEF DESCRIPTION OF THE DRAWINGS

The invention can be put into effect in numerous ways, illustrative embodiments of which are described below with reference to the drawings, wherein:

FIG. 12a depicts, in a side view, an example embodiment of an inlet valve or outlet valve of a pump head.

FIG. 12b depicts, in a partial cross-sectional side view, the inlet or outlet valve in FIG. 12a.

DETAILED DESCRIPTION OF EMBODIMENTS

Figure 1A:
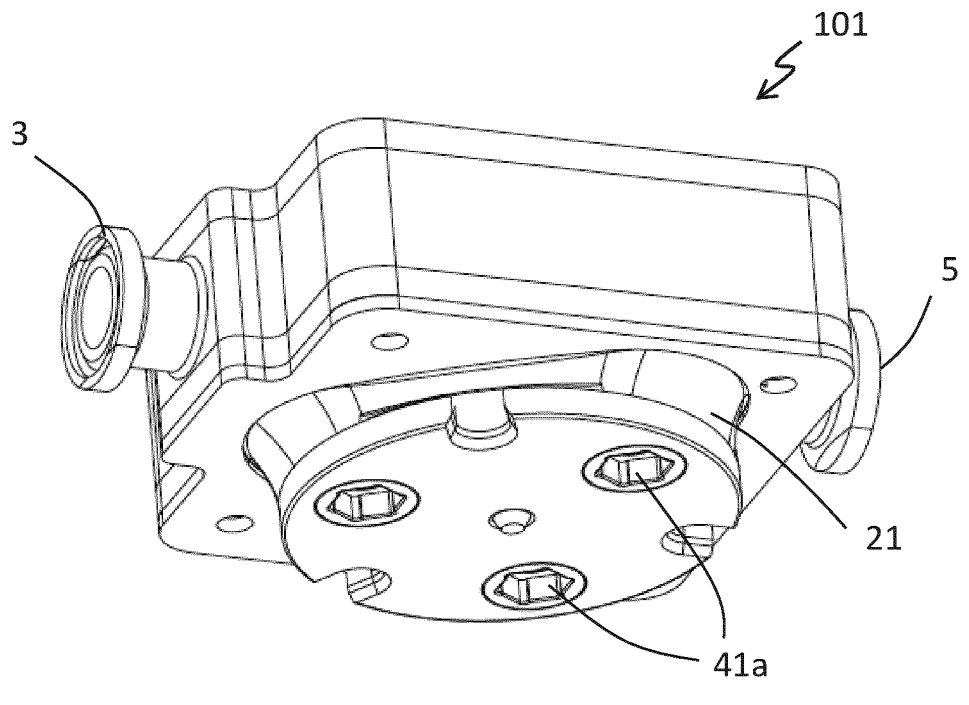
FIG. 1a is a perspective view of a pump head according to one embodiment of the invention.

The invention, together with its objects and the advantages thereof, may be understood better by reference to the following description taken in conjunction with the accompanying drawings.

There are a few different embodiments of the invention shown in the drawings, however corresponding components are named and numbered the same. For example, FIGS. 2, 3a and 4 show different embodiments of a pump head 1; 101; 201 according to the invention but corresponding separate parts will be given the same numbers and some of the details shown in other drawings can be valid for more than one of the different embodiments.

Figure 2:
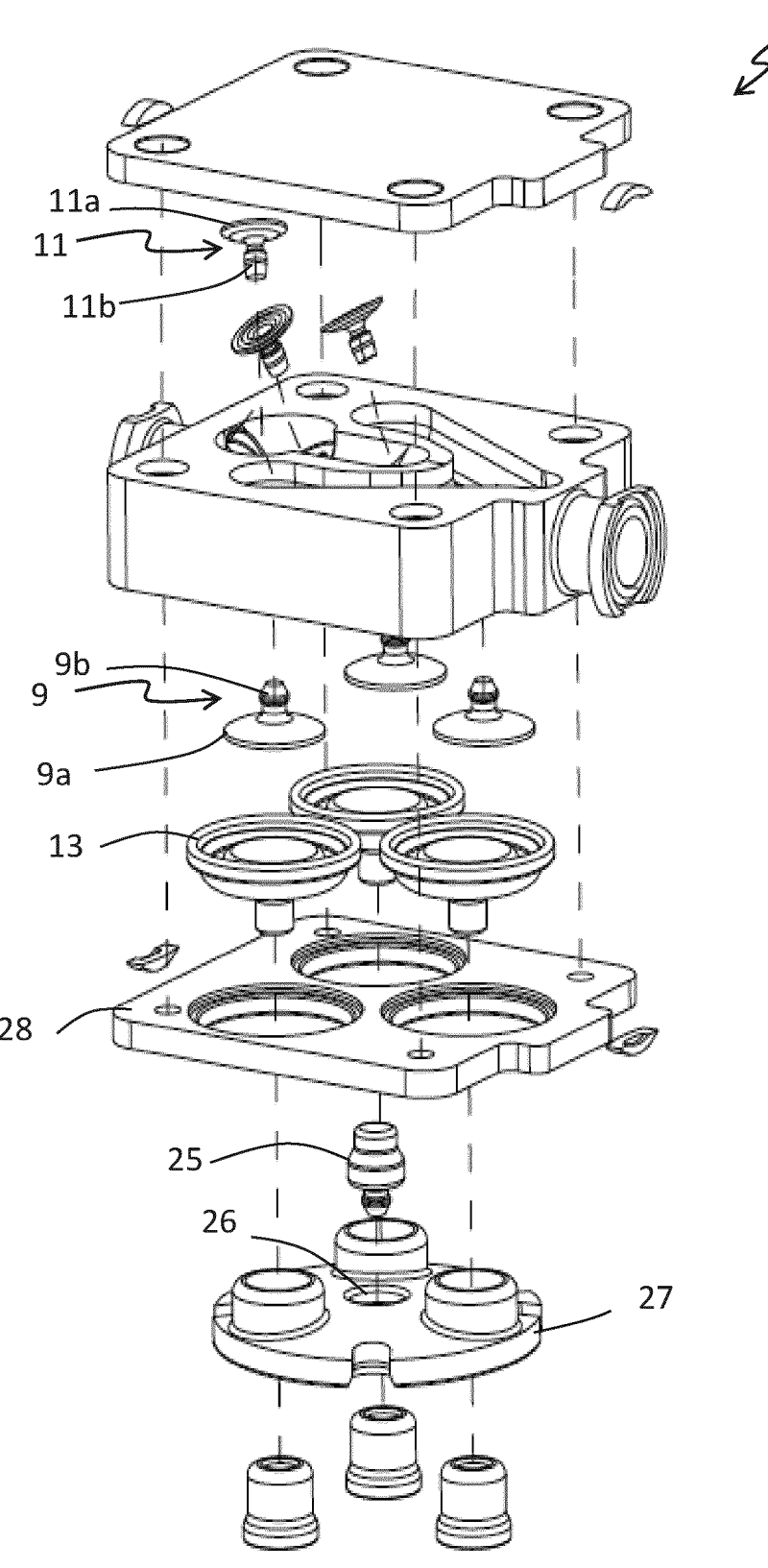
FIG. 2 is an exploded view of a pump head according to one embodiment of the invention.
Figure 3A:
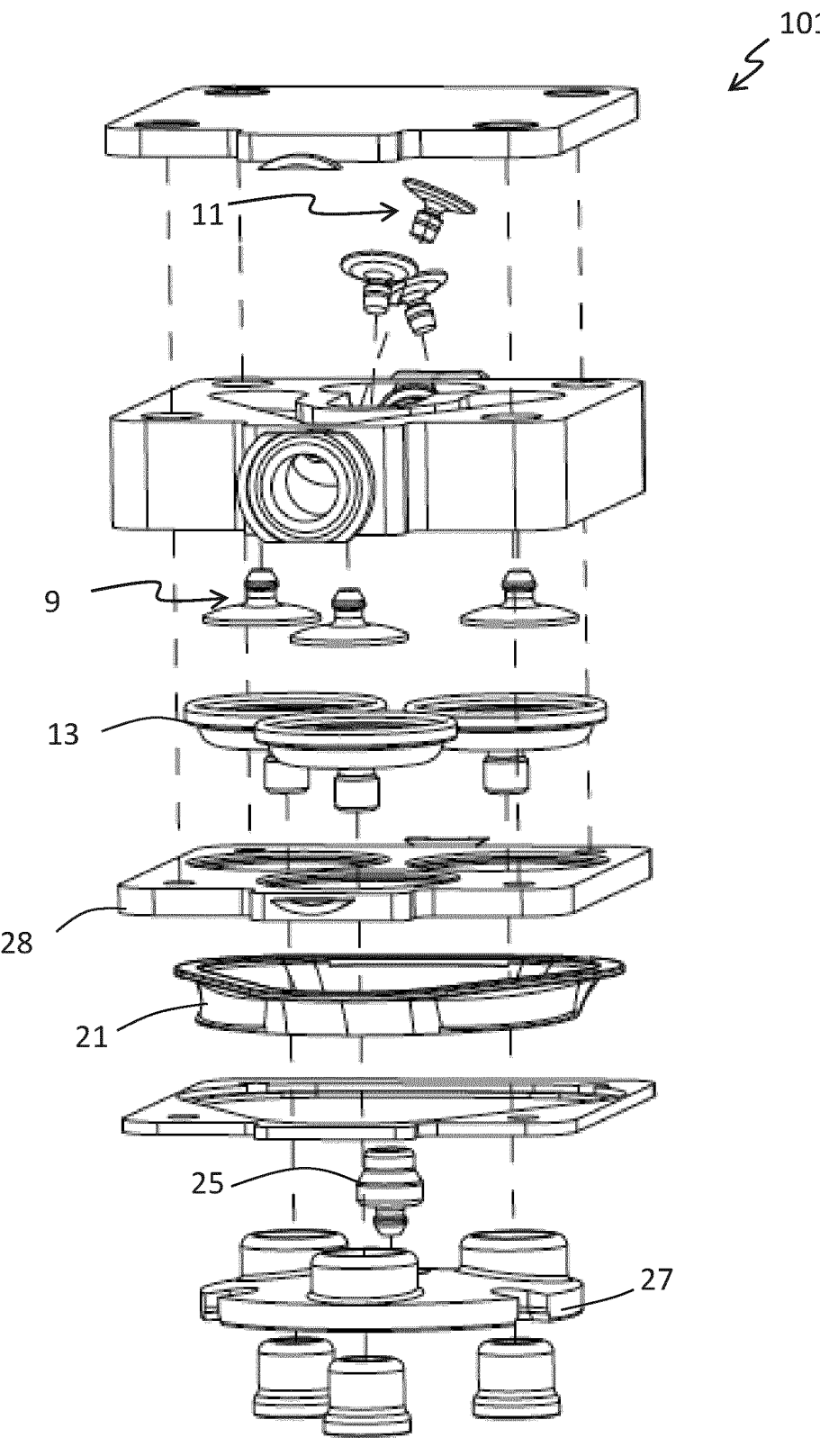
FIG. 3a is an exploded view of the pump head as shown in FIG. 1.
Figure 4:
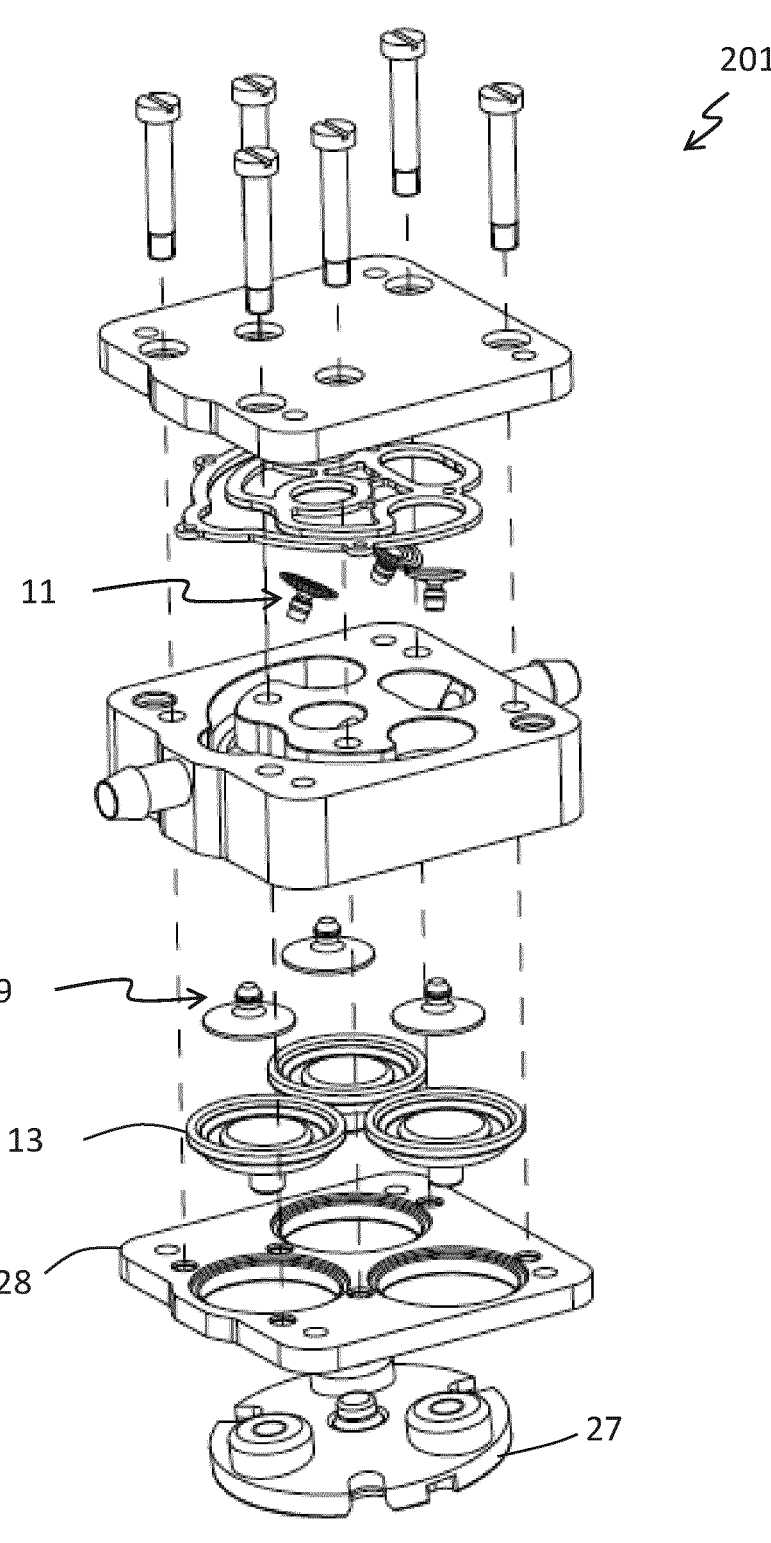
FIG. 4 is an exploded view of a pump head according to another embodiment of the invention.

FIGS. 2, 3a and 4 are exploded views of the pump heads 1; 101; 201. The pump heads 1; 101 of FIGS. 2 and 3a are configured to be assembled by a welding method, such as suitably diffusion bonding, i.e. the parts are made from suitable plastic and they are compressed and heated to bond to each other. A diffusion bonding production method will avoid the use of screws and sealing. However, another welding method can as well be used or the parts could alternatively be rivet together. In FIG. 4 another embodiment of a pump head 201 is shown. This pump head is configured to be assembled by screws. Most parts are however the same or corresponding to the parts of the pump heads 1; 101 shown in FIGS. 2 and 3a.

Figure 1B:
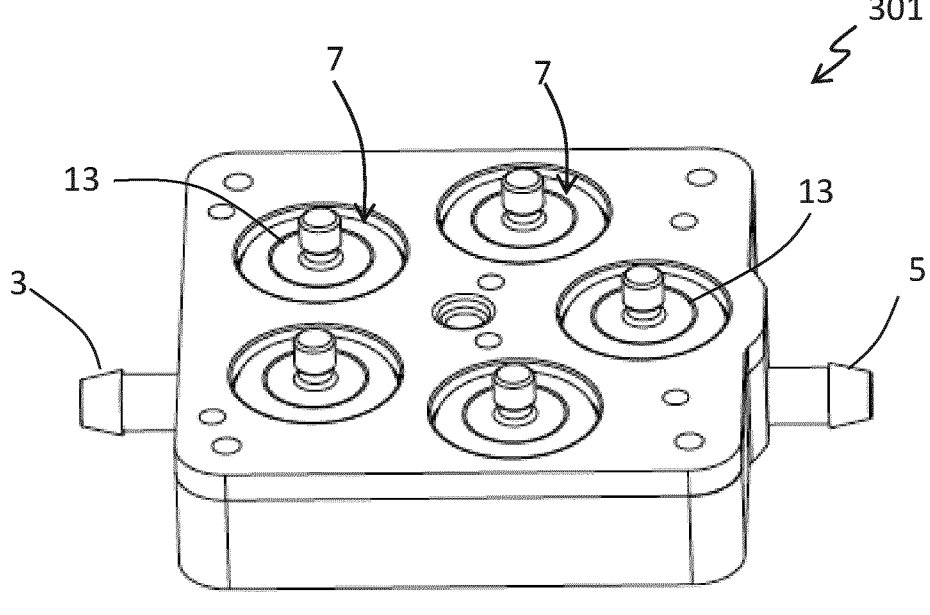
FIG. 1b is a pump head according to another embodiment of the invention with five cavities instead of three.
Figure 5A:
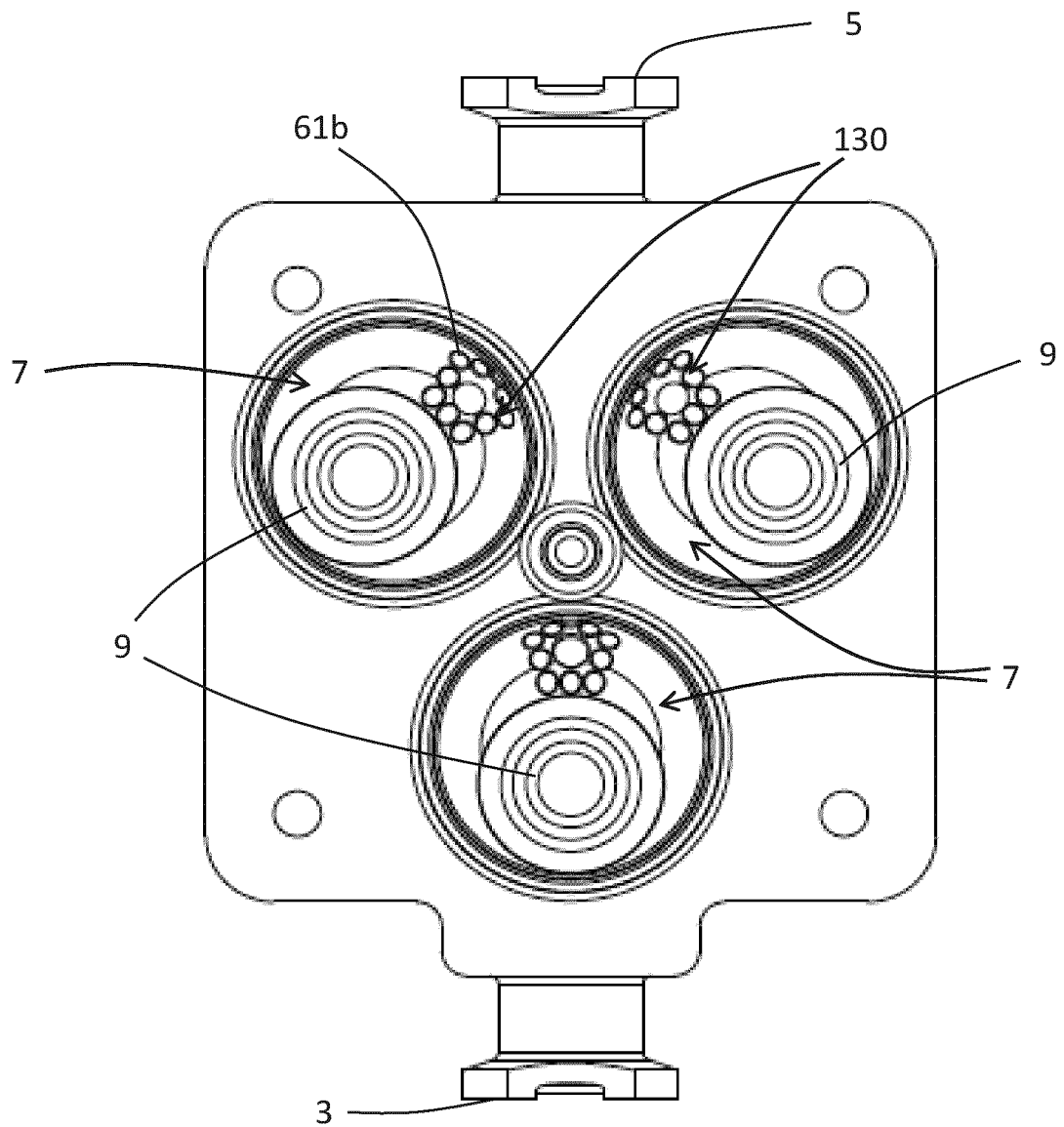
FIGS. 5a and 5b are top view cross sections in different planes of a pump head according to one embodiment of the invention.
Figure 5B:
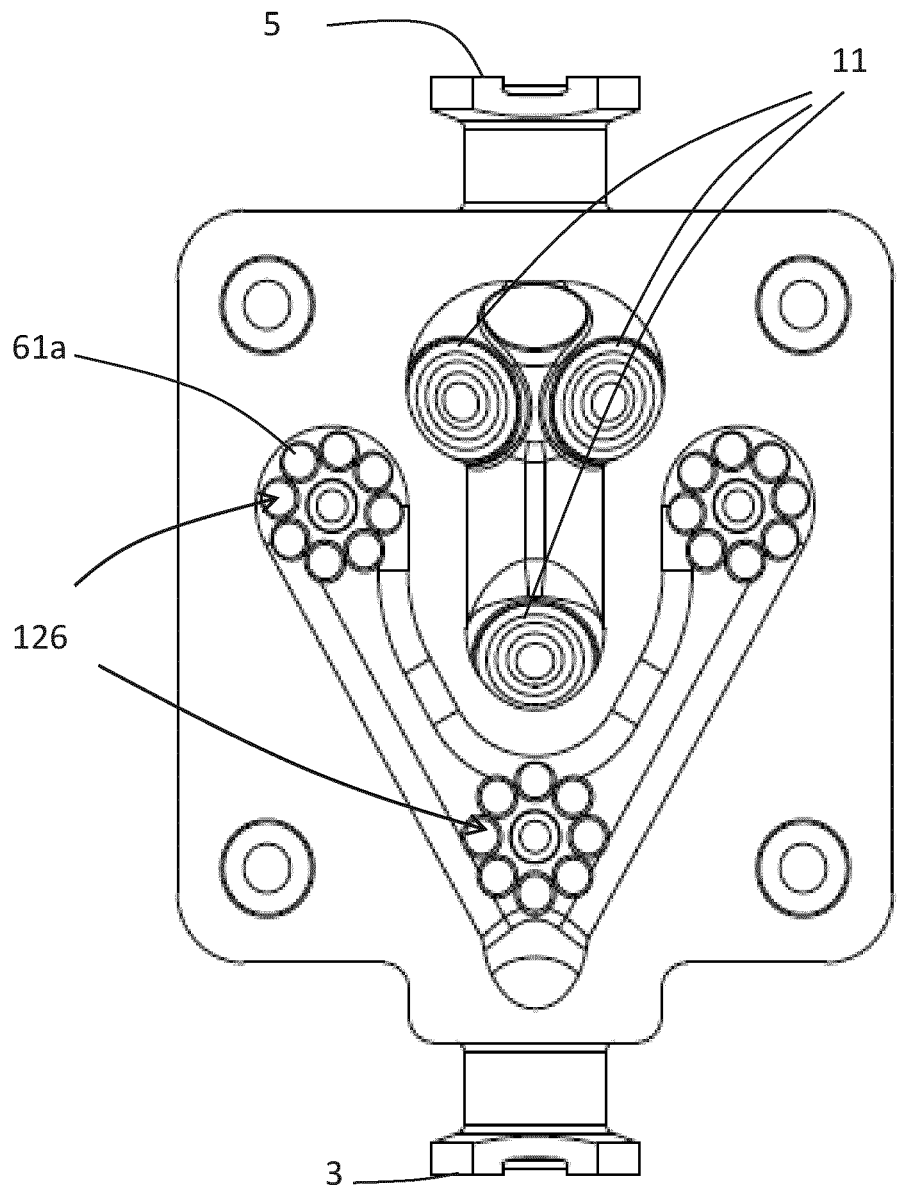
Figure 6:
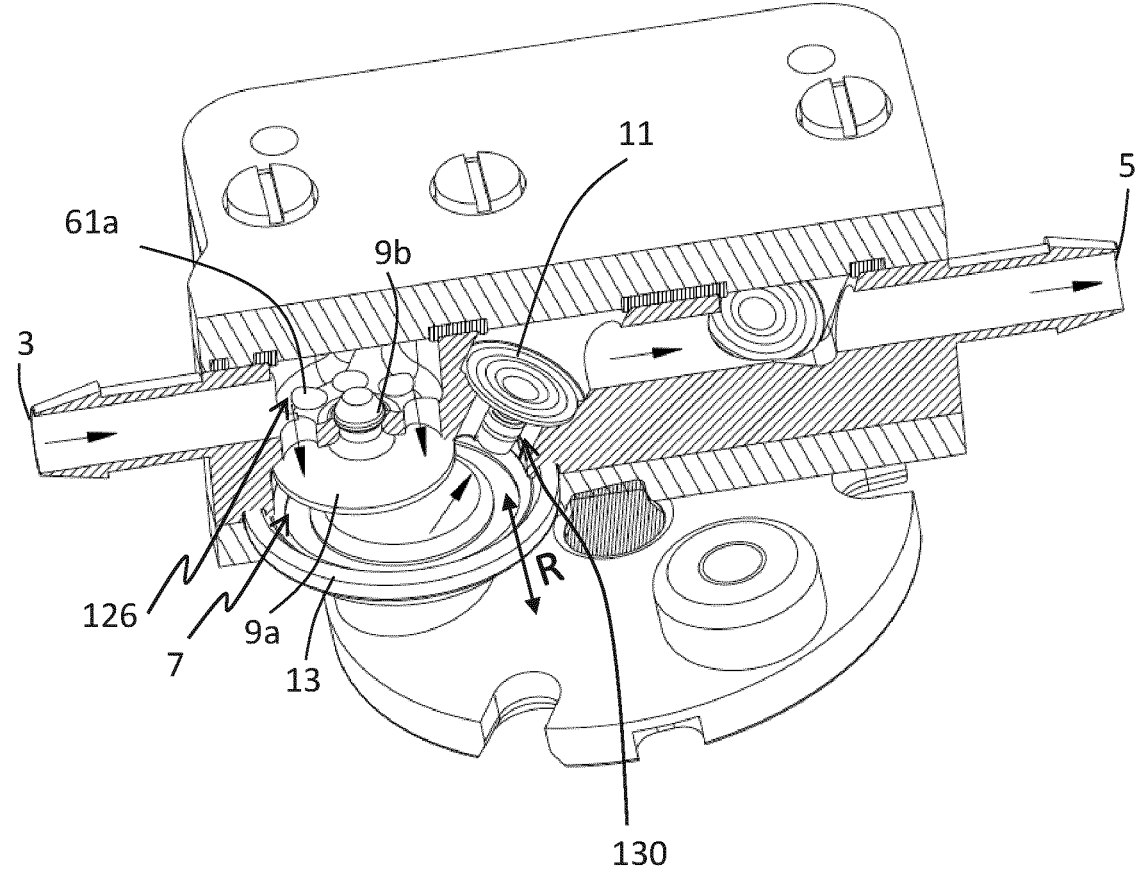
FIG. 6 is a side view cross section in part of a pump head according to one embodiment of the invention showing flow in the pump head.
Figure 7A:
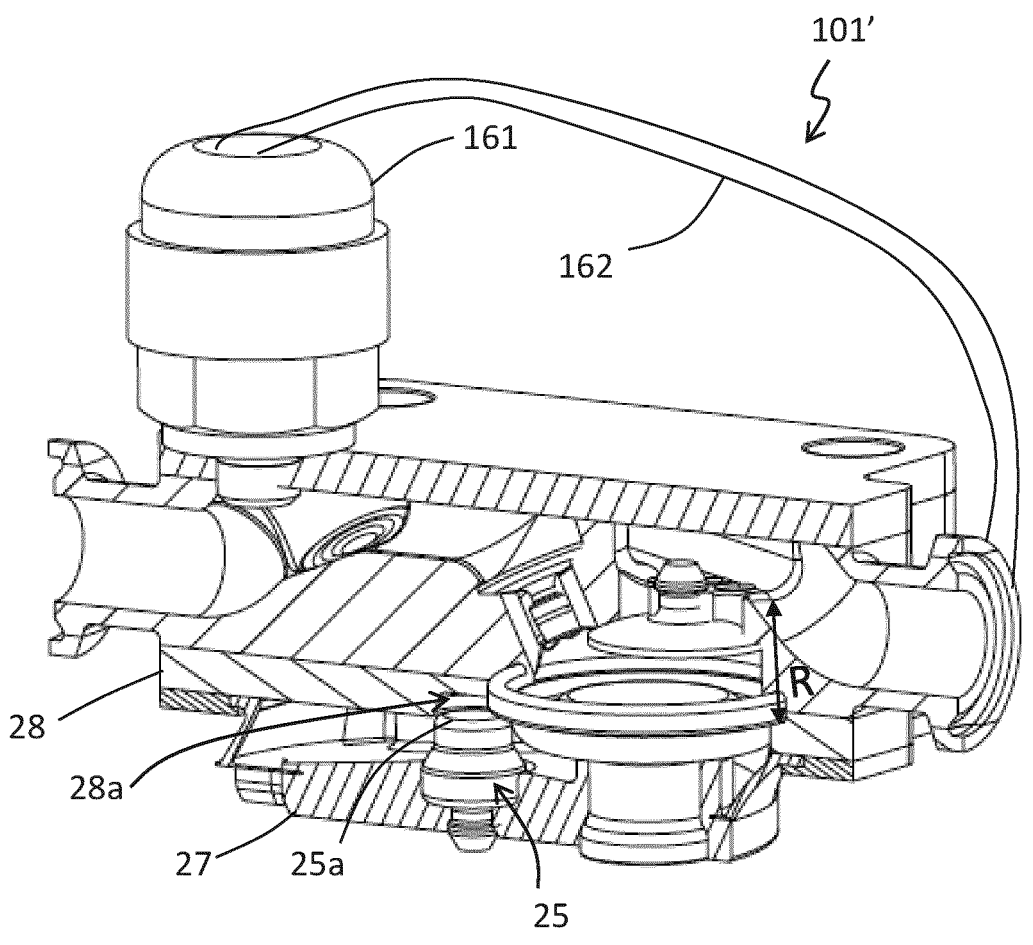
FIG. 7a is a side view cross section in part of a pump head according to one embodiment of the invention.
Figure 7B:
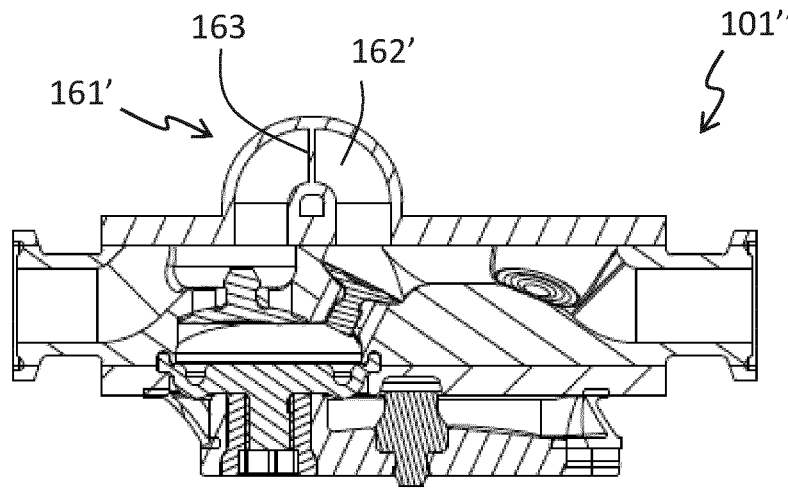
FIG. 7b is a side view cross section of a pump head according to one embodiment of the invention.
Figure 8A:
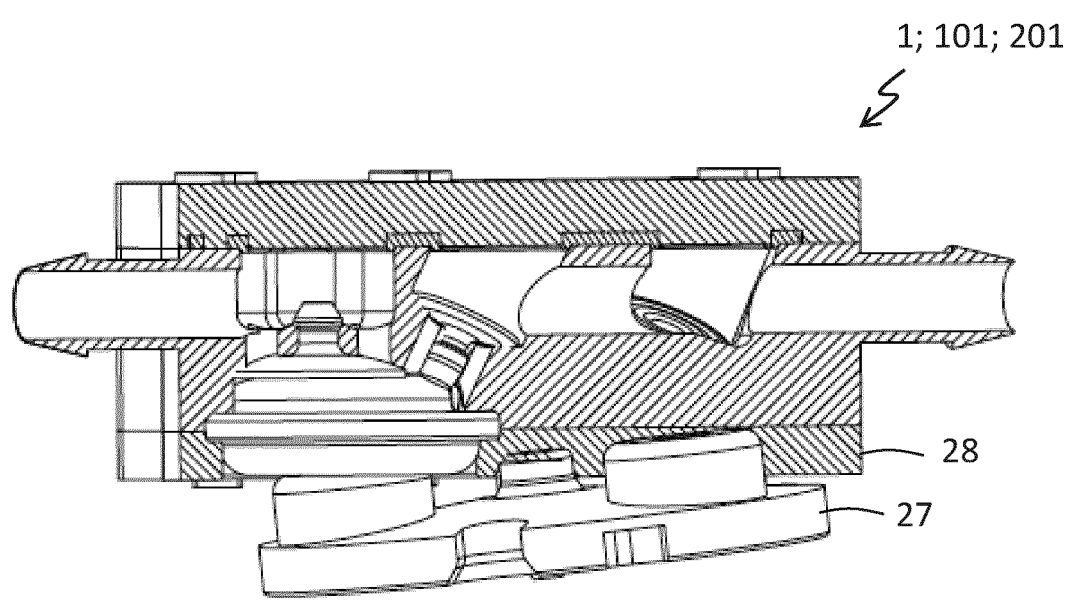
FIGS. 8a and 8b show section views of a pump head according to one embodiment of the invention.
Figure 8B:
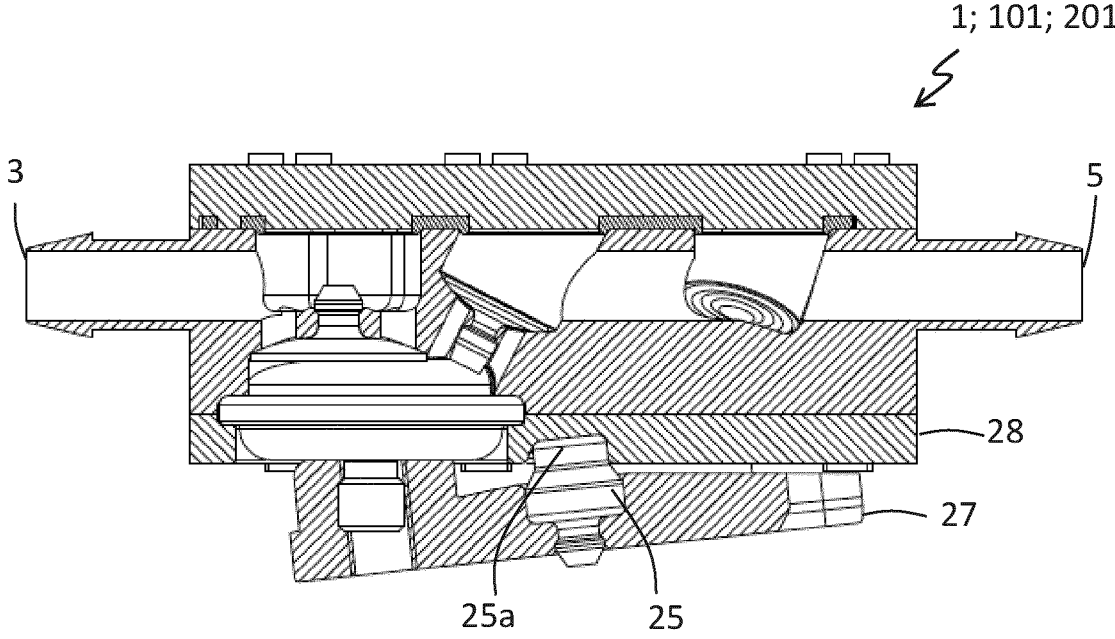

FIG. 1a is a perspective view of the pump head 101 which is shown in FIG. 3a as assembled. FIG. 1b is a pump head 301 with five cavities 7 instead of three. FIGS. 5a and 5b are top view cross sections in different planes of the pump head 101 as shown in FIGS. 1 and 3a but the design in this view is similar for all embodiments shown in FIGS. 2, 3a and 4. FIG. 6 is a side view cross section in part of the pump head 201 as shown in FIG. 4 but the design is very similar also for the pump heads shown in FIGS. 2 and 3a. FIGS. 7a and 7b are side cross sections of a pump head 101', 101" similar to the one shown in FIG. 3a but with an extra external part 161, 161' for connecting inlet and outlet. FIGS. 8a and 8b show details of a pivot point which can be provided in all the embodiments of the invention.

FIG. 9 shows a pump drive 31 according to one embodiment of the invention. The invention will now be described with reference to all the drawings.

The invention relates to a diaphragm pump comprising a pump head 1; 101; 201 and a pump drive 31. The invention further relates to a pump head 1; 101; 201 configured to be used connected to a pump drive 31 of a diaphragm pump. The pump head comprises a common inlet 3, a common outlet 5 and plural pump cavities 7. Each pump cavity 7 comprises at least one cooperating pair of one-way valves, wherein the at least one pair of one-way valves comprises an inlet valve 9 and an outlet valve 11. The respective inlet valves 9 are in fluid communication with the common inlet 3 and the respective outlet valves 11 are in fluid communication with the common outlet 5. According to the invention a centre of the outlet valve 11 for each pump cavity 7 is positionable above a centre of the inlet valve 9 for the same pump cavity 7 when the diaphragm pump is oriented for use to inhibit trapped gas. When the outlet valves 11 are provided above the inlet valves 9 in each cavity 7 air will effectively be transported out from the pump head instead of being trapped. By providing one inlet valve 9 and one outlet valve 11 for each cavity and provide them in positions such that for each cavity a centre of the outlet valve 11 can be provided above a centre of the inlet valve 9 which is provided for the same cavity air can effectively by purged and the problem of trapped air is avoided. The positioning of the outlet valves in relation to the inlet valves within each cavity may differ somewhat depending on the design and performance of the valves. It does not necessarily in all cases have to be a centre of the outlet valve that is positioned above a centre of the inlet valve. It would rather be a centre of the flow of the outlet valve which should be positioned above a centre of the flow of the inlet valve.

The pump head 1; 101; 201 comprises furthermore moveable diaphragms 13 provided in said pump cavities 7 for varying a volume of the pump cavities. The drive 31 of the diaphragm pump is configured to transfer a motion to the diaphragms 13 of the pump head 1; 101; 201 for accomplishing a fluid displacement from the common inlet 3 to the common outlet 5 of the pump head 1; 101; 201 as a result of said varying of the volume of the pump cavities 7.

Figure 12:
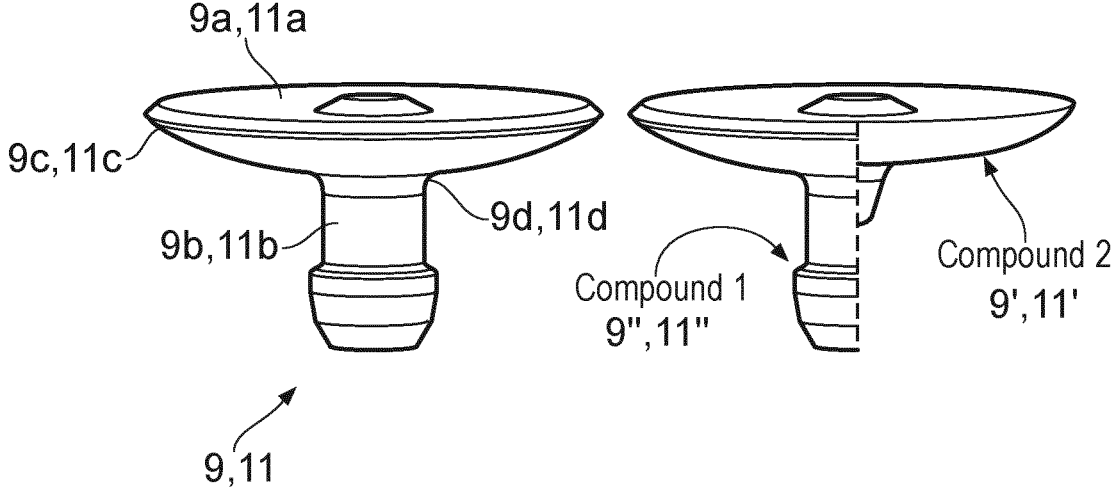
Figure 13:
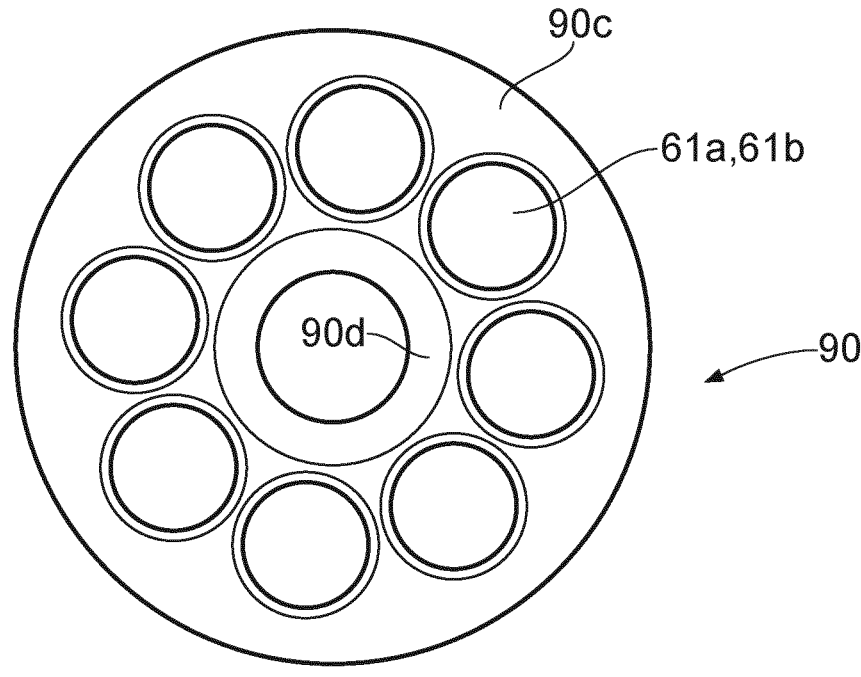
FIG. 13 depicts, in a top view, a pump cavity inlet or outlet valve area.

The inlet and outlet valves 9, 11 can include flexible valve disks, 9a, 11a, each disk including a generally central retaining stem 9b, 11b for holding the valve disk 9a, 11a in place. The flexible valve disks 9a, 11a may have a crescent shape in cross section or they can alternatively be flat. Such valves can be called umbrella valves and are suitable because they are symmetrical and can be used in an optimal space saving way. They can also be optimised easily for different pressure and sealing requirements. Possible materials of the valves are for example TPE, silicon and EPDM. A duck valve is an example of another type of valve which can be used. The material of the valves and dimensions and design of the valves should be chosen such that opening and closing pressures for the valves are as small as possible. FIG. 12a depicts, in a side view, an example embodiment of an inlet valve 9 or outlet valve 11. Said inlet or outlet valve 9, 11 comprises a central retaining stem 9b, 11b, a flexible valve disk 9a, 11a, an outer sealing area 9c, 11c and a valve stem sealing area 9d, 11d. FIG. 13 depicts, in a top view, a pump cavity inlet or outlet valve area 90. The pump cavity inlet or outlet valve area 90 comprises a central hole 66 for holding and guiding the inlet or outlet central retaining stem 9b, 11b. The central hole 66 is not configured for fluid transit. Said pump cavity inlet or outlet valve area 90 further comprises eight inlet or outlet channels 61a, 61b, a valve seat 90c and a valve sealing surface 90d. In FIG. 13 eight inlet or outlet channels are used, in various example embodiments the number of channels may be higher or lower, e.g., 2, 4, 5, 6, 10, 12 or 15. The inlet or outlet channels 61a, 61b may have the same or different diameter.

Figures 14, 15:
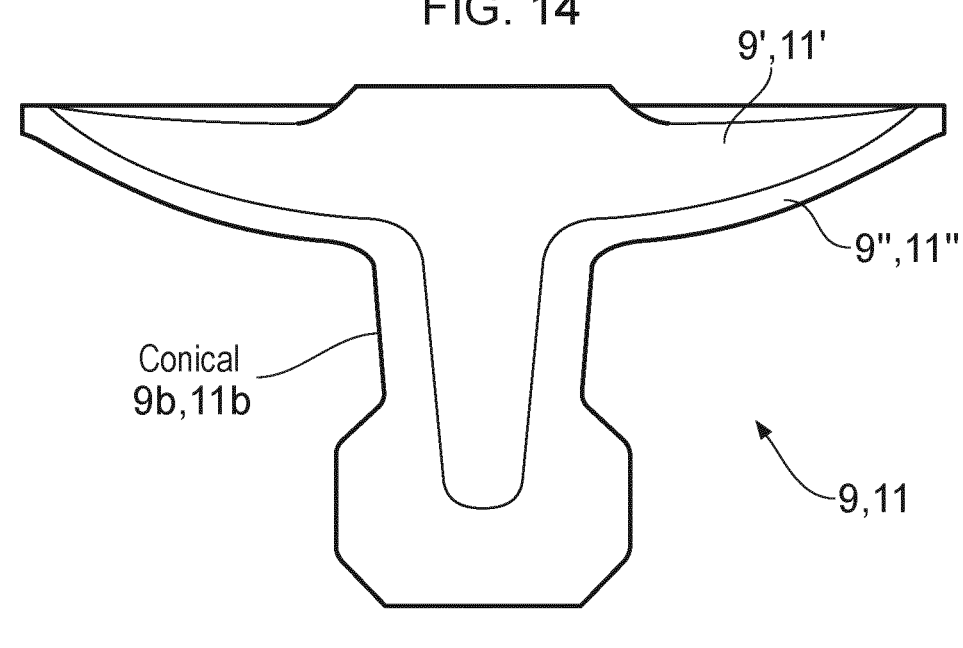
FIG. 14 is an enlarged cross-sectional view of sealing areas of an inlet or outlet channel.
FIG. 15 depicts a cross sectional view of an alternative example embodiment of an inlet or outlet valve of a pump head.

The outer sealing area 9c, 11c of said inlet or outlet valve 9, 11 is configured to seal against said valve seat 90c. The valve stem sealing area 9d, 11d is configured to seal against said valve sealing surface 90d. In a closed valve position said outer sealing area 9c, 11c of said inlet or outlet valve is in contact with said valve seat 90c. In the closed valve position said valve stem sealing area 9d, 11d is in contact with said valve sealing surface 90d. FIG. 14 is an enlarged cross-sectional view of the sealing areas of one of the inlet or outlet channels 61a, 61b. In FIG. 14 the valve 9, 11 is in its closed position, i.e., said outer sealing area 9c, 11c of said inlet or outlet valve 9, 11 is in contact with said valve seat 90c and said valve stem sealing area 9d, 11d is in contact with said valve sealing surface 90d.

In the closed valve position a predetermined force may be applied on said central retaining stem 9b, 11b for ensuring a liquid tight closed position. In an open valve position for the inlet valve 9, said flexible valve disk 9a is deformed by the suction force form the diaphragm 13 and the flow of liquid from the inlet channels 61a. In an open valve position for said outlet valve 11, said flexible valve disk 11a is deformed by the flow of liquid from the outlet channels 61b. In the open valve position said outer sealing area 9c, 11c of said inlet or outlet valve is at least partially not in contact with said valve seat 90c. In the open valve position said valve stem sealing area 9d, 11d is still in contact with said valve sealing surface 90d for ensuring no liquid passage through the central hole 66. Opening of inlet or outlet valve 9, 11 is performed by deforming the outer sealing area 9c, 11c so that the sealing is broken with said valve seat 90c.

In various example embodiments said inlet or outlet valve 9, 11 is made of one homogenous single flexible material. In various example embodiment at least the outer sealing area 9c, 11c of said inlet or outlet valve 9, 11 is made of a first material, whereas a core of said valve may be made of a second material. Said first material in said outer sealing area 9c, 11c may be more flexible than said second material in said core of said valve 9, 11.

FIG. 12b depicts, in a partial cross-sectional side view, an example embodiment of an inlet valve 9 or outlet valve 11 having a core 9', 11' made of a first material and an outer layer 9", 11" made of a second material. The second material is more flexible/soft than said first material. The outer layer 9", 11" comprising said outer sealing area 9c, 11c of said flexible valve disks 9a, 11a configured to seal against at least a portion of a corresponding valve seat 90c in said pump head 1; 101; 201; 301. The suitable flexibility of said second material will both provide for improved sealing characteristics and improved longevity compared to prior art solutions.

In various example embodiments said inlet and outlet valve 9, 11 may also comprising said first softer material in a valve stem sealing area 9d, 11d configured to seal against at least a portion of a corresponding valve sealing surface 90*d* in said pump head 1; 101; 201; 301. In various example embodiments said valve sealing surface 90*d* and/or said valve seat 90*c* may also be made of said second material.

In various example embodiments said softer material in said outer sealing area 9*c*, 11*c* of said flexible valve disk 9*a*, 11*a* and/or said valve stem sealing area 9*d*, 11*d* of said valve 9, 11 may be applied as said layer 9", 11" having a predetermined thickness onto said core 9', 11' having said second material. FIG. 15 depicts a cross sectional view of an inlet or outlet valve 9, 11 having said core 9', 11' made of said first material and said outer layer 9", 11" made of said second material. The core may form part of the flexible disk 9*a*, 11*a* and said central retaining stem 9*b*, 11*b*. At least a portion of said central retaining stem 9*b*, 11*b* may have a frustoconical shape. The frustoconical shape of said central retaining stem 9*b*, 11*b* may improve the longevity of the valve 9, 11 as it may reduce its wear and friction when said central retaining steam 9*b*, 11*b* is sliding in said central hole 66 of said pump cavity.

Figure 16:
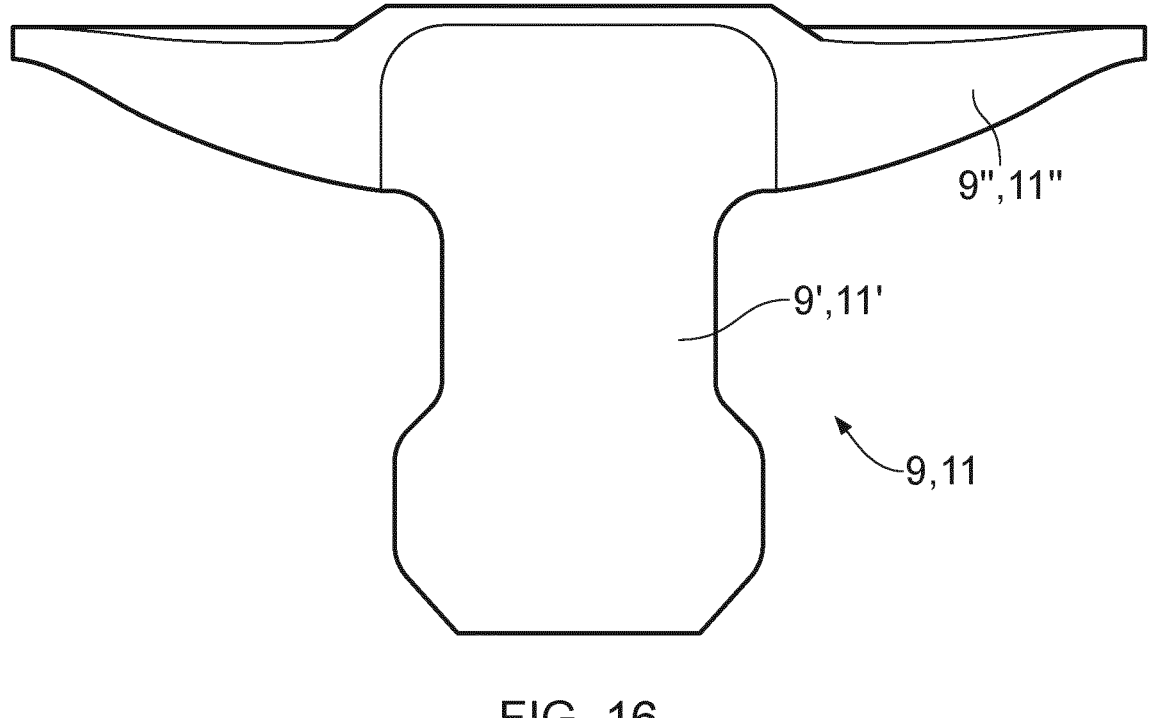
FIG. 16 depicts yet an alternative example embodiment of an inlet or outlet valve of a pump head.

FIG. 16 depicts an alternative example embodiment of an inlet or outlet valve 9, 11 made of said first and second material. In FIG. 16 said central retaining stem 9*b*, 11*b* is made of said first material and said flexible valve disk 9*a*, 11*a* is made of said second material. In FIG. 16 said core 9', 11' made of said first material is only partially covered by said outer layer 9", 11". In FIG. 16, the outer sealing area 9*c*, 11*c* of said flexible valve disk 9*a*, 11*a* is made of said second material whereas said valve stem sealing area 9*d*, 11*d* is made of the first material.

In the embodiments as shown in FIG. 1*a* and FIGS. 2-8 three pump cavities 7 are provided all in fluid communication, via a respective pump cavity inlet 126, with the common inlet 3. The embodiment as shown in FIG. 1*b* comprises five pump cavities 7 but is otherwise similar to the other embodiments and will not be described in further detail. Each pump cavity inlet 126 includes a one-way inlet valve 9 allowing fluid flow into, but not out of the pump cavity 7. Each pump cavity 7 is in further fluid communication, via a pump cavity outlet 130, with the common outlet 5. Each pump cavity outlet 130 includes a one-way outlet valve 11 which allows fluid out of, but not into the pump cavity 7. In another embodiment, multiple one-way inlet valves and/or multiple one-way outlet valves are provided.

Each pump cavity 7 further comprises a flexible material diaphragm 13 capable of being moved in reciprocating motion in the direction of arrows R (shown in FIGS. 6 and 7), by a driving means 35 (one example being a wobble plate is shown in FIG. 9). The driving means can be for example by mechanical means connected to a mechanical interface. Examples of other types of driving means include pneumatic pressure fluctuations, hydraulic pressure fluctuations, or mechanical movements derived from motors or electrical solenoids and the like.

Each pump cavity inlet 126 comprises in this embodiment plural inlet channels 61*a* which are provided around a circle. Also, the pump cavity outlet 130 comprises in this embodiment plural outlet channels 61*b* which are provided around a circle. This can be seen in FIGS. 5*a* and 5*b*. The plural inlet channels 61*a* for each of the cavities 7 are all closed by the corresponding one-way inlet valve 9, in this case in the form of a simple elastomeric cup which bends to allow fluids into the cavity 7 but is forced over the inlet channels 61*a* by fluid pressure to close them to prevent fluid escape via the inlet channels 61*a*. The outlet valve 11 is similar in construction to the inlet valve 9 and allows fluid out but not back into the cavity 7. The flexible diaphragms 13, comprise in this embodiment a disk-shaped moulding formed from elastomeric material. FIG. 6 shows one of the cavities 7, having plural inlet channels 61*a* (the central hole for holding the inlet valve retaining stem 9*b*, and not for fluid transit), and the plural fluid outlet channels 61*b*, again with a central hole for the outlet valve retaining stem 11*b*.

The pump head 1; 101; 201, 301 can further comprise a pivot device 25 provided to a centre, C, of a diaphragm engagement plate 27 of the pump head 1; 101; 201; 301 for providing a central pivot point to the diaphragm engagement plate 27 around which the diaphragm engagement plate 27 can tilt. This can best be seen in FIGS. 8*a* and 8*b*. Hereby it is assured that the diaphragm engagement plate 27 which is engaging the diaphragms 13 of the pump head 1; 101; 201 always will pivot around its centre, C, and hereby the diaphragms 13 will be both effectively pushed and retracted and hereby a complete filling of the pump cavities 7 can be provided even at high motor frequency and when fluid inlet pressure is low, for example when fluid sources are placed at low positions in relation to the pump. The pivot device 25 can for example be a rubber element which can be squeezed into an opening 26 in the diaphragm engagement plate 27. A recess 28*a* is provided in a diaphragm holding plate 28, whereby said recess 28*a* receives a first end 25*a* of the pivot device 25 which is protruding out from the diaphragm engagement plate 27, whereby said pivot device 25 is designed such that a distance is provided between said diaphragm engaging plate 27 and said diaphragm holding plate 28. An alternative to the pivot device 25 is to connect the wobble plate 25 and the diaphragm engagement plate 27, for example by a mechanical fixation such as a clamping, by bayonet or by magnetism. Automation features may be provided to accomplish said mechanical or magnetic fixation, such for example motorized or electromagnetic locking, and/or the utilization of a reversed pump drive rotation.

Figure 3B:
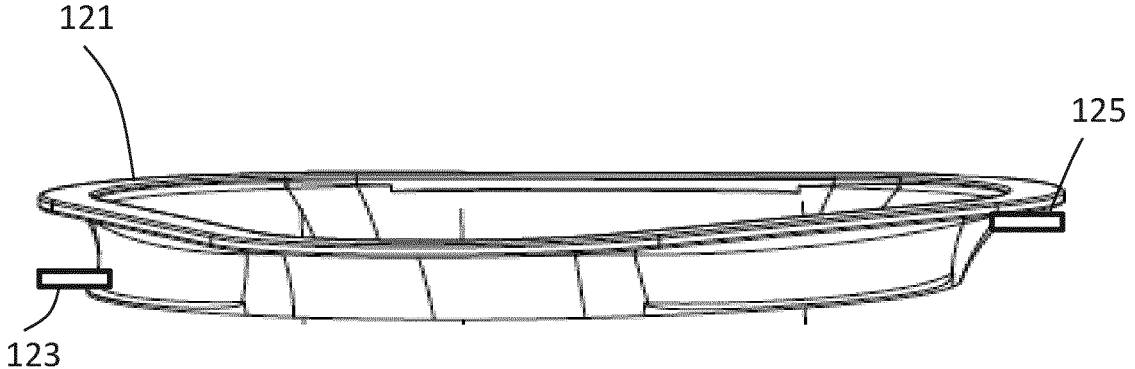
FIG. 3b shows a leakage collector according to one embodiment of the invention.

The pump head 1; 101; 201 may further comprise a leakage collector 21; 121 which is a flexible bellow surrounding the pump cavities 7 and diaphragms 13 and which is configured to collect possible leakage from the pump cavities 7. Leakage collectors 21; 121 are shown in FIGS. 3*a* and 3*b*. Two or more leakage collectors may surround individual pump cavities and diaphragms, however, for reasons of cost and simplicity preferably one single leakage collector 21; 121 is used for collecting possible leakage from all the pump cavities 7. The leakage collector 21 can be an elastic bellow which can be made from a highly flexible elastomer. As can be seen in FIG. 3*a* the leakage collector 21 can be provided between the diaphragm engagement plate 27 and a diaphragm holding plate 28 of the pump head. Such a leakage collector 21 can as well be provided in the embodiment of the invention which is shown in FIG. 4, which is assembled by screws instead of diffusion bonding. The leakage collector 21; 121 should seal against both the diaphragm engagement plate 27 and the diaphragm holding plate 28. A leak sensor (e.g. conductivity sensor or total reflection prism for optical detection like in dishwasher or a load cell may be applied to a low end of the leakage collector 21; 121 to detect leakage. Alternatively, a change in pump flow at a given pump speed can be read as failure of one pump chamber. When using a leakage collector 21; 121 according to the invention the diaphragms 13 can be fully optimized for optimal hardness to accomplish the pumping task over a large range rather than being compromised for example by adding secondary layers in the diaphragm for the leak protection as in some prior art products. The leakage collector 21; 121 can also be clean and pre-sterilized, hence any process fluid collected by the leakage collector 21; 121 may be recovered without contamination. Furthermore, by using a leakage collector 21; 121 according to the invention no fluid is exposed outside the closed process line of the system, hence there is no risk for the operators being exposed to harmful substances, like viruses. No de-contamination of the room is required when possible leakage is contained within the single use flow path (the pump). A drainage passage can be provided in for example the diaphragm holding plate 28 and the sensor can be provided there.

In FIG. 3b a leakage collector 121 according to another embodiment of the invention is shown. Such a leakage collector 121 can be used in all the different pump heads 1; 101; 201; 301 as described according to the invention. In this embodiment the leakage collector 121 comprises a bottom drain port 123, which optionally can be provided with an aseptic connector. The bottom drain port 123 can be used in the event of a fluid leakage from the pump chamber into the leakage collector to drain and recover valuable or alternatively dangerous process fluid. The leakage collector 121 is clean and sterilized in the same way as the rest of the pump head and hereby any possible fluid leakage can be recovered. A second port 125 can also be provided to the leakage collector 121, which second port 125 can be a vent port to allow for venting the leakage collector 121. The second port can suitably be positioned at a top position of the leakage collector 121 when the pump head is mounted to a pump drive. The second port 125 can be positioned on an opposite side of the leakage collector 121 compared to where the drain port 123 is positioned. The second port 125 can be provided with a sterile air filter possibly connected with a pre-fitted aseptic connector.

Figure 9A:
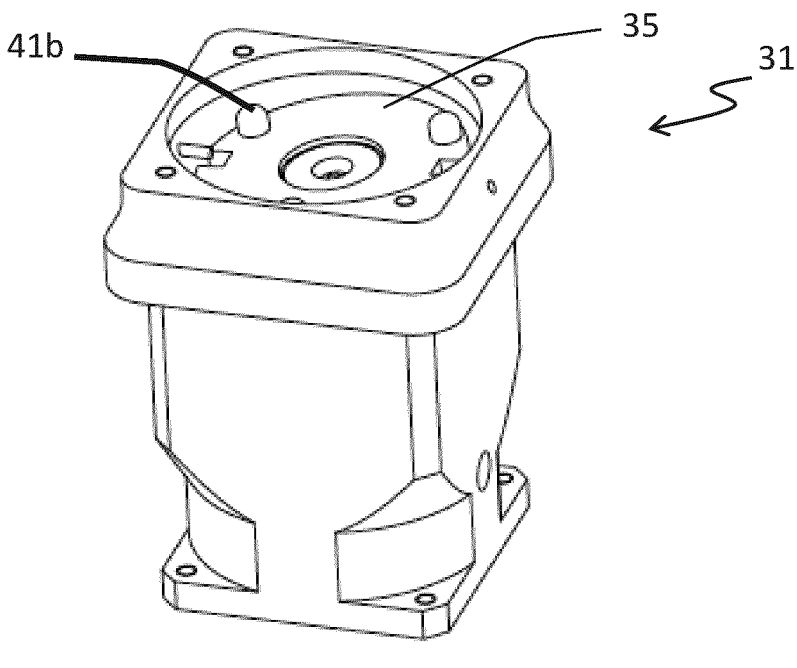
FIGS. 9a and 9b show a pump drive in a perspective view and in cross section.
Figure 9B:
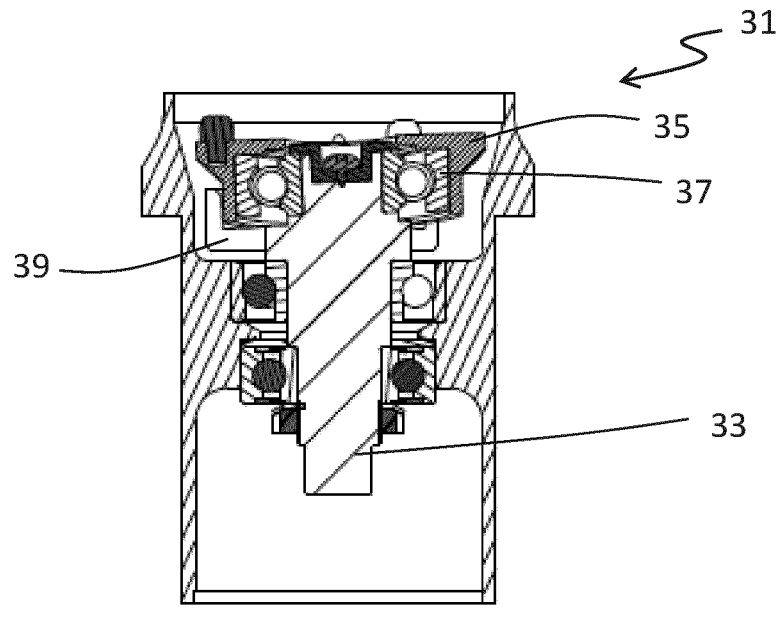

A pump drive 31 according to one embodiment of the invention is shown in FIGS. 9a and 9b. The pump drive 31 may comprise a rotating drive shaft 33 and a wobble plate 35 which is connected inclined to the drive shaft 33 via a bearing 37. The wobble plate 35 is configured for connection to the pump head 1; 101; 201 for transferring a movement from the rotating drive shaft 33 to the diaphragms 13. As a result of the rotation of the drive shaft 33 about its longitudinal axis, and thanks to the inclined connection via the bearing, e.g. a roll bearing, the wobble plate 35 is enabled to perform a circumferential wobbling motion without co-rotating with the drive shaft 33. This circumferential wobbling motion is transferred to a motion of the diaphragms 13 and hereby a pumping action is achieved. The degree of inclination of the wobble plate 35 to the drive shaft 33 can be varied which will vary the maximum and minimum pump flow rate of the pump. The tilted angle can also be adjusted in a dynamic fashion such that the angle and hereby the pump stroke can be adjusted without removing or replacing parts, and even during operation of the pump within or in between different processing operations and process steps.

Figure 10A:
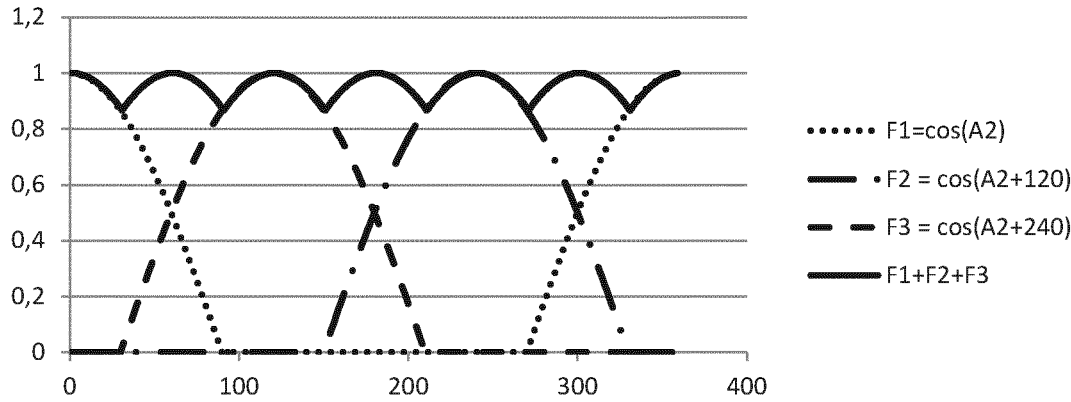
FIG. 10a shows a diagram of outlet flow.
Figure 10B:
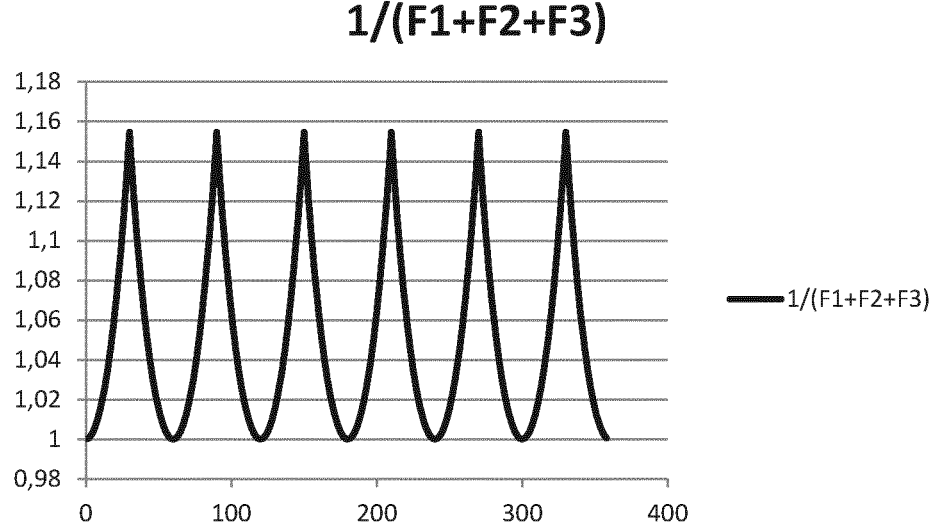
FIG. 10b shows a diagram of pump drive compensation.

In some embodiments of the invention the pump drive 31 can be configured to apply an active modulation of the pump speed over the rotation of the drive shaft 33 for compensating pulsation of the pump. If three pump cavities are provided radially distributed around a centre C of the pump head 1; 101; 201 the drive shaft can be controlled to increase its speed every 120 degrees by for example approximately 15% when the drive shaft is sweeping over certain angle positions of the drive shaft to compensate for the temporary drop in flow rate in between two discharge actions. FIG. 10a shows flow as a function of A2 angle position for the drive shaft, i.e. uncompensated outlet flow (i.e. constant angle speed A2 for the drive shaft) from a diaphragm pump according to the invention, which diaphragm pump comprises three cavities 7 and three diaphragms 13. The flow from each of the cavities is denoted F1, F2 and F3 respectively and the sum of flows is shown as F1+F2+F3 in FIG. 10a. The flow can be compensated by adjusting the A2 angle speed as a function of the A2 angle position. The speed modulation is 1/(F1+F2+F3), which is shown in FIG. 10b. FIG. 10b is a diagram showing motor speed modulation as a function of angle position. It may be beneficial to compensate only at low angle speed where the pulsations will have the biggest impact. In some embodiments of the invention the active modulation of the pump speed can also be provided dynamically using a pressure sensor and on top of the fixed modulation also control the average motor speed. A motor with position control, such as a stepper motor, can suitably be used for this embodiment such that the angular position of the drive shaft in relation to the pump head can be registered.

The pump head 1; 101; 201 according to the invention can suitably comprise three or five pump cavities 7 which are radially distributed around a centre C of the pump head 1; 101; 201. Hereby pulsation is reduced significantly compared to for example a four cavity design due to favourable addition of sine curves in discharge action. Low pulsation is in particular advantageous for low flow rates and low rpm. This low pulsation allows the pump to be used over a wide operating range. Pulsation-free operation allows for better, more stable and robust process control at low flow rates. If also the active modulation as described above is used the pulsation is further decreased.

The diaphragm engagement plate 27 of the pump head 1; 101; 201 and the wobble plate 35 of the pump drive 31 may comprise cooperating connection features 41a, 41b which are provided for avoiding any rotation and friction between the wobble plate 35 and the diaphragm engagement plate 27. Hereby wear out of components due to friction can be avoided.

For a single use pump head, the mounting of the pump head to the instrument should preferably not require the use of any extra tools. Hereby a simple mounting of pump head to pump drive is provided which is especially advantageous for a single use pump head. The connection between pump head and pump drive can additionally comprise engaging levers and/or automated solutions that may be driven by motor, pneumatics or magnetics. A circular lock mechanism could also be provided between the pump head and pump drive.

Especially for a single-use pump head, where frequent attachment and detachment of a pump head to a pump drive is required for the assembly and removal of a flow path and consumable, a safe, efficient and user-friendly mounting procedure is crucial to the efficiency, quality and robustness of the bioprocessing operation.

The mounting procedure for the pump head may involve positioning, alignment and/or attachment of the pump head with the instrument and/or the pump drive may involve controlled actions for movement or rotation of parts relative to each other, clamping or locking of components. These actions may be accomplished manually by the operator or they may be partly or fully automated. The procedure may involve multiple steps in which certain steps may be achieved manually and others accomplished by automation. Manual and/or automated steps may be assisted by motors, (electro-)magnets or pneumatics, for example. Corresponding features may assist also the disassembly and removal of the pump head from the drive.

In some embodiments, steps involved in mounting and/or removal of a pump head may be monitored and facilitated by sensors and/or indicators showing status information to the user. For example, sensors may detect if the pump head is in the right position during one or several of said steps. Sensors may also monitor and confirm that the pump head is in correct position prior, during and/or after the operation of the bioprocessing system. In one embodiment, a counter is provided tracking the use of the pump head, for example by counting the number of revolutions or pump strokes. Said counter may be provided mechanically or electronically by a feature positioned in or at the pump head, but information may also be provided by the control system and instrument such that for example a RFID tag at the pump head may be re-written, thereby providing up to date information on the pump head, its status, use and/or usage history.

Figure 11:
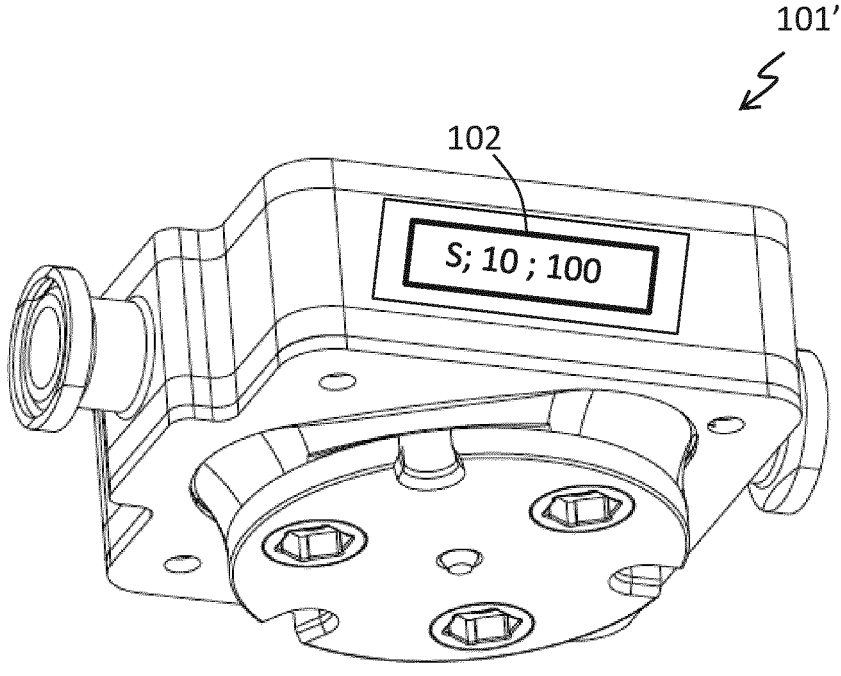
FIG. 11 is a perspective view of a pump head according to one embodiment of the invention.

In another embodiment of the invention, the pump head is provided with an indicator displaying status information for the pump, for example indicating a pump running state, correct operation, idle state, flow rate or pressure information, information on trapping of air etc. Said information may be displayed by qualitatively, for example by change of colour, intensity or flashing frequency of a light, e.g. an LED or a display. In another embodiment, the light intensity and/or the colour of lightning is varied and/or the character or frequency of the lightning augmentation is varied in dependence of the pump operation, operating parameters or other parameters of the pump or system, Alternatively, information may be displayed quantitatively by displaying figures on a display surface showing for example current flow rate or pressure in numbers. Such a display surface could for example suitably be positioned on the pump head plate facing the user. A pump head 101' comprising a display 102 is shown in FIG. 11, however in this example the display 102 is provided on a side surface of the pump head 101'.

In one embodiment, a display made of an LCD or alike is provided. In another embodiment, a eINK (electronic ink) display is provided that allows to retain information on the display also without power supplied to the display, hereby allowing to display current and relevant information on the pump and/or pump head when the unit is not in use, not assembled or not connected to a power supply. Hereby, a single-use pump head consumable may also display up to date information during storage, transport, before or after use such that a user can easily identify the status of the consumable. An eINK display with colour display capability may be provided to accommodate before mentioned information during both processing and during pre- and postprocessing such as in storage, assembly, disassembly, disposal, recycling, etc.

In one embodiment, the display and or eINK display may show up to date information on the pump head, its status, use and/or usage history before and after use and installation with an instrument and system. The information display may also show pictorial information such as icons, arrows, graphs etc. Information displayed may guide the user during installation and assembly processes, for this purpose the display may be driven by a build in battery or by an energy harvesting device. Information may be transmitted wirelessly to the pump head display or other local indication means, for example previously mentioned status light indicators.

In another embodiment, the pump and/or pump head supports asset performance management (APM) by transmitting and/or displaying information on status, function, history, wear and tear, service interaction etc. to allow improved monitoring, analytics as well as predicting, planning and improving workflows, for example. Sensors may be provided to support the asset performance management scope.

In another embodiment of the invention, the pump head is provided with sensors for monitoring properties of the processing fluid, such for example pressure, conductivity, pH, osmolarity, viscosity, temperature etc. Sensors may be provided upstream, downstream or within one or multiple pump chambers. In one embodiment, a pressure sensor is provided in the inlet flow path of the pump head to monitor the suction head, for example to detect proper operating conditions during use. This sensor may also be used to detect errors in the setup or interruptions and blockage of the inlet flow path, such as for example throttling by a tubing that is too long, of too small diameter, blocked or pinched. Sensor information may be used in an installation procedure and/or installation test for the pump and/or the flow kit. Said sensors may be connected to a display at the pump and/or pump head or may be connected to the system and its control system. Information from said fluid sensors may also be utilized for previously mentioned scope of asset performance management. In various example embodiments of the present invention at least one pressure sensor may be provided in the outlet flow path of the pump head to monitor a pump pressure. This pressure sensor may also be used to detect errors in the setup or interruptions and blockage of the outlet flow path, such as for example throttling by a tubing that is too long, of too small diameter, blocked or pinched. Sensor information may be used in an installation procedure and/or installation test for the pump and/or the flow kit. Said sensors may be connected to a display at the pump and/or pump head or may be connected to the system and its control system. In various example embodiments at least one pressure sensor is provided in the inlet flow path and at least one pressure sensor is applied in the outlet flow path of the pump head. Having pressure sensors at both the inlet path and outlet path of the pump head may be used to monitor the pump efficiency of the pump head.

In one embodiment, the pump head and/or pump drive is provided with a tagging means for information storage that may be deployed for identification of components or readout of specific components details, such as for example production or sterilization date, calibration data, QC information etc. Information may be stored by RFID tag, bar code, 2D bar code etc., corresponding readers for readout of information may be provided at the pump drive or the instrument and system. Portable readers may also be used to readout information before, during and after use of the pump components with the system. Said information on the component may be used for the batch record documentation and for controlling (electronic) workflow instructions during processing including installation, removal and disposal of a pump head. When applied to a re-usable pump head, cleaning, service and/or storage information may be (re-)written and updated on the identifier or an associated separate tag, display or memory component. In one embodiment of the invention, information is stored on an eINK display in numerical or bar code tag format.

In another embodiment of the invention, the pump head is made from transparent or opaque material allowing a visual inspection of the pump chamber internals. Suitable materials could for example be acrylic, polycarbonate or COC (cyclic olefins, e.g. TOPAS). The visual inspection does allow the user to visually inspect or get feedback on the movement of the pump diaphragm, the action of check valves, the presence, movement or displacement of liquid and/or air, and/or the speed of pump action itself. In one embodiment the pump chamber is lit by a light source to augment visibility. In another embodiment, the light intensity and/or the colour of lightning is varied and/or the character or frequency of the lightning augmentation is varied in dependence of the pump operation, operating parameters or other parameters of the pump or system, In one embodiment, the intensity of light augmentation in a pump chamber is altered with the diaphragm position throughout a pump stroke by a light path being blocked when the diaphragm is in a certain position, such as the discharge position.

Polymers such as polypropylene, polyethylene, peek, Topas etc. may be used for the rigid pump head housing components. The diaphragm 13 and/or the one-way valves may be made of elastomers typically thermoplastic elastomers (TPE) like for example Santoprene, Mediprene. Elastomeric parts may be selected such that optimal performance is achieved with/after sterilization and gamma irradiation, respectively.

In another embodiment of the invention the wobble plate 35 action can be translated to axial movement of one individual axial piston for each diaphragm. Axial actuation of each diaphragm may result in improved performance and increased diaphragm lifetime compared to an angled engagement which is the case with the diaphragm engagement plate 27.

In some embodiments of the invention the pump head 1; 101; 201 is a single use pump head and the pump drive 31 is reusable. The pump head can suitably be pre-sterilized, for example by gamma irradiation. The pump head can be provided with aseptic connectors. The pump drive can also be connected to a single use flow path providing a single use flow path assembly according to the invention. Single use, also called disposable, components are suitable in many bioprocessing systems because of the requirements in many systems for aseptic or sterile conditions. The advantage of using single-use technology (SUT) fluid handling equipment is primarily that cross-contamination in between production batches and campaigns is reduced or completely eliminated when the SUT equipment is used for a single drug product only. The SUT equipment is disposed of after use, which can be after a single run, batch or campaign comprising multiple runs and batches. When providing SUT equipment pre-sterilized or bioburden controlled, initial cleaning and sanitization (for example by contacting the flow path with sodium hydroxide solutions) or sterilization can be avoided. When using the SUT for a single run or batch only, even cleaning post-use may be omitted. With these features, SUT equipment provides improved efficiency, safety and convenience.

The pump head 1; 101; 201 can be a closed compartment without sealings which has been produced from a number of plastic layers which have been connected by a welding method, such as for example diffusion bonding. Such a production method can provide a pump head 1; 101; 201 which can handle a pressure up to at least 20 bar. Hereby no backing plate needs to be provided to the pump head. Furthermore, a diffusion bonding production method will avoid the use of screws and sealings. The pump body may be manufactured as one piece by means of layer by layer formations, for example so called 3D printing or additive manufacturing. Thus, a plastics construction can be made, or a metallised formation can be made and post-processed to make a consolidated metal pump body.

According to the invention a single use flow path assembly for a bioprocess system, such as for example a separation system, a purification system, a chromatography system, a filtration system, a bioreactor or a module in a personalized medicine system is furthermore provided. The single use flow path assembly comprises a pump head 1; 101; 201 as described above which is connected to a single use flow path. Said single use flow path assembly may be pre-sterilized.

A bioprocess system, such as for example a separation system, a purification system, a chromatography system, a bioreactor or a module in a personalized medicine system comprising a diaphragm pump as described above is also provided according to the invention.

In some embodiments of the invention inlet and outlet could be connected via an external part 161; 161' and a separate channel 162; 162'. This can be seen in FIGS. 7a and 7b. Said external part 161; 161' comprises a pressure regulation valve 163, only seen in FIG. 7b. In FIG. 7b a pressure regulation valve 163 in the form of a membrane is shown. More than one membrane could as well be provided for avoiding liquid to stay inside the external part 161'. This external part 161; 161' and separate channel 162; 162' enables a pump which can be set on a specific pressure which it can deliver as its max. If a higher pressure is provided the liquid will be circulated inside the pump instead of being pushed forward. In various example embodiments of the present invention the inlet and/or outlet of said diaphragm pump may be aseptic fluid connections. Aseptic fluid connections may be advantageous in bio process systems where the pump is not pre-assembled into a bio process fluid path up-and/or downstream of said diaphragm pump.

A method for integrity testing using air can also be provided by the present invention. The pump according to the invention has improved performance and capabilities in regard to check valve tightness when pumping air. Not only does it allow for robust self-priming at large suction heads, it also allows for reliable and accurate pumping and compression of air. It is therefore we are proposing new methods of using the pump in single-use applications, where flow path and component testing without introduction of liquid should be preferable. Prior art systems rely on application of liquids for conducting performance tests and installation verification tests.

A method for testing and verifying the integrity of a diaphragm pump according to the invention and/or a flow path assembly comprising a diaphragm pump according to the invention is proposed which relies on pumping of air and compressing said air downstream the pump. In one embodiment of method for pumping and compressing air, a pressure decay method is applied, where the pump is used to compress air against a closed fluid path downstream the pump until a certain pressure is reached in a first step, and where pressure loss over time is monitored in a second step using a pressure sensor positioned in the pressurized fluid path. As a result, an air tightness of the fluid path can be quantified and results can be compared with a pre-defined acceptance criteria, for example. In another embodiment, a constant flow pressure method is applied, where the pump is used to maintain a target air pressure or pressure within an error band by pumping air in an incremental or continuous fashion, and where the pump speed or the number of pump strokes required to maintain said pressure is evaluated to derive a leakage quantification for the fluid path. Again, the determined pumping action can be compared against a predefined acceptance criteria. In one embodiment, information obtained from said air pumping and compression is used to qualify, verify or calibrate the pump or components of the flow path assembly. In another embodiment, said air pumping and compression is used to determine and/or verify a correct configuration of flow path components, for example correct flow path size and length or the correct action of flow path or system components, for example valves, sensors and pumps.

As discussed above the pump head is in some embodiments of the invention assembled by diffusion bonding. Hereby some elastomeric functional components such as the inlet and outlet valves 9, 11 and the diaphragms 13 are integrated into the bonded design and hereby some sealings which are necessary for other production methods can be avoided. This is suitable because a closed design with few materials is achieved and a device is achieved with increased tightness, pressure resistance and which is easier to clean compared to devices which are assembled by other methods. The elastomeric components need to be chosen such that they are not destroyed or degenerated by the heat provided in the bonding process. In various example embodiments of the present invention said diaphragm 13 may comprise an elastomer layer and a reinforcement layer. Said reinforcement layer may be embedded in said elastomer layer. In various example embodiments of the present invention said diaphragm 13 comprises a layered structure, at least one elastomer layer and at least one reinforcement layer. In various example embodiments the reinforcement layer may be a web structure made of fabric or elastomer material having less elasticity compared to the elastomer layer. In the layered structure of the diaphragm said reinforcement layer may be provided on an opposite side of a liquid or biomaterial contact surface, i.e., attached on a non-liquid or non-biomaterial contact surface of the pump head.

Figure 17A:
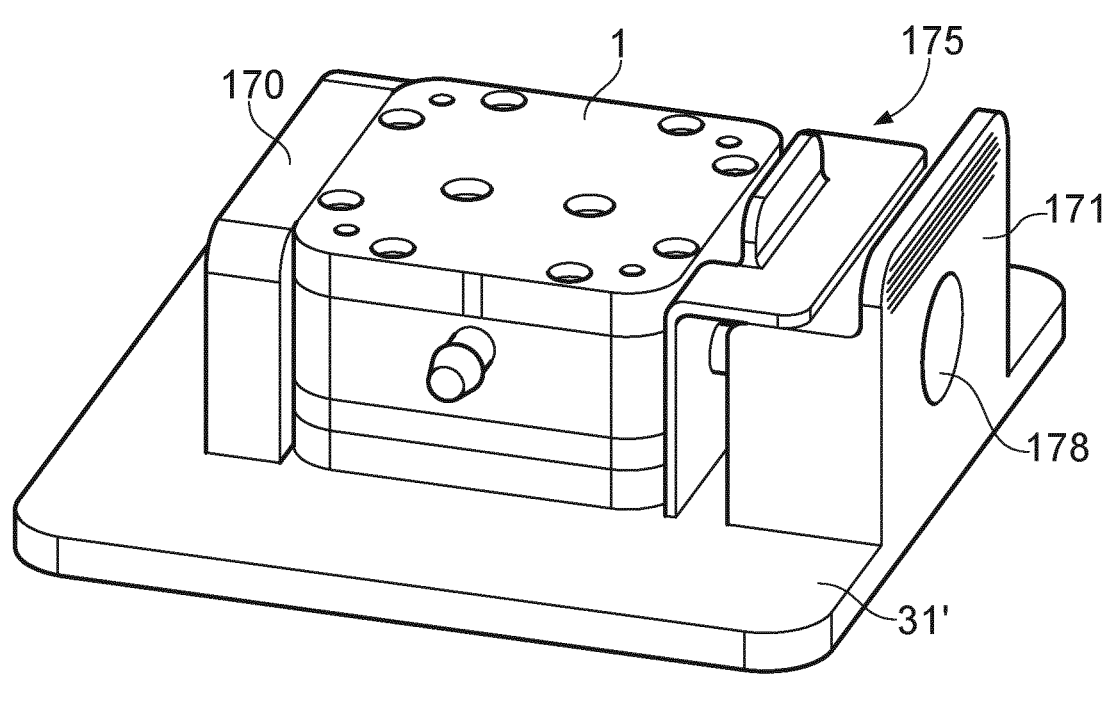
FIG. 17a-17d depict in various views a first example embodiment of a quick-connect fastener for removably fastening a pump head to a pump drive.

FIG. 17*a*-17*d* depicts in various views a first example embodiment of a quick-connect fastener for removably fastening said pump head 1 to said pump drive 31. In FIG. 17*a*-17*d* only a top portion 31' of the pump drive 31 is shown. Said top portion 31' comprises a first support structure 170 and a second support structure 171 spaced apart from each other and configured for receiving said pump head 1. Said first and second support structures 170, 171 are configured for restricting lateral movement of said pump head in at least one lateral direction. Said second support structure 171 comprises a resilient member 175 operable between a locked position in which said pump head 1 is locked to said pump drive 31 and an unlocked position in which said pump head 1 is releasable and removable from said pump drive 31. In FIG. 17*a* the pump head 1 is attached and locked to the pump drive 31. The pump head 1 may comprise locking means in the form of at least one recess 180, 182 configured to receive a corresponding locking means in the form of a protrusion 174', 173 respectively provided in said support structures 170, 171. The first and second recesses, 182, 180 in said pump head 1 may be fixed. The first protrusion 173 provided in said first element 170 may also be fixed. The second protrusion 174' is provided in said resilient member 175. Said resilient member comprising a guiding element 174 configured to move in an opening 176 in said second element 171. A flange 172 provided on a top portion of said resilient member 175 may be used for operating said resilient member in an open position. At least one spring 190 will force the resilient member 175 in a closed position. A first stop flange 177, provided at a first end of said guiding element 174, may be used for restricting the movement of the resilient member 175 in said closed position when no pump head 1 is arranged in said pump drive 31. The first stop flange 177 is configured to move in a recess 178 of said second element 171. The recess is larger than said opening 176 and said first stop flange 177 is larger than said opening 176. The second stop flange 179, provided at a second end of said guiding element 174, may be used for restricting the movement of said resilient member 175 in said open position. The second stop flange 179 contact said second element 171 in fully open position and said second stop flange 179 may contact said pump head 1 in fully closed position. The first stop flange 177 may be removable from said guiding element 174. Said stop flange 177 may be attached to said guiding element with at least one screw 177'.

Figure 17B:
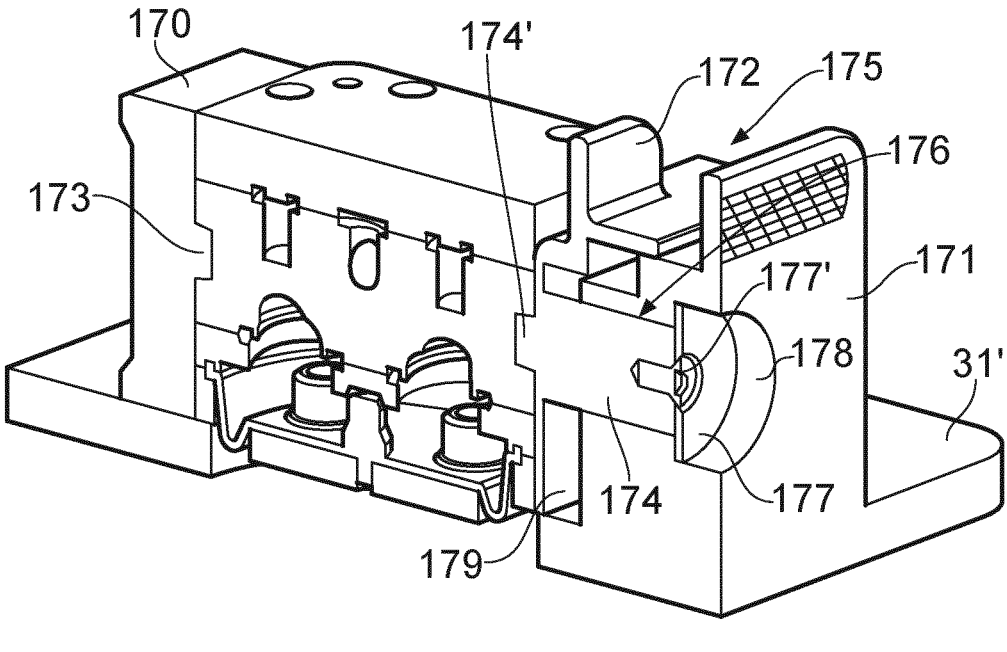
Figure 17C:
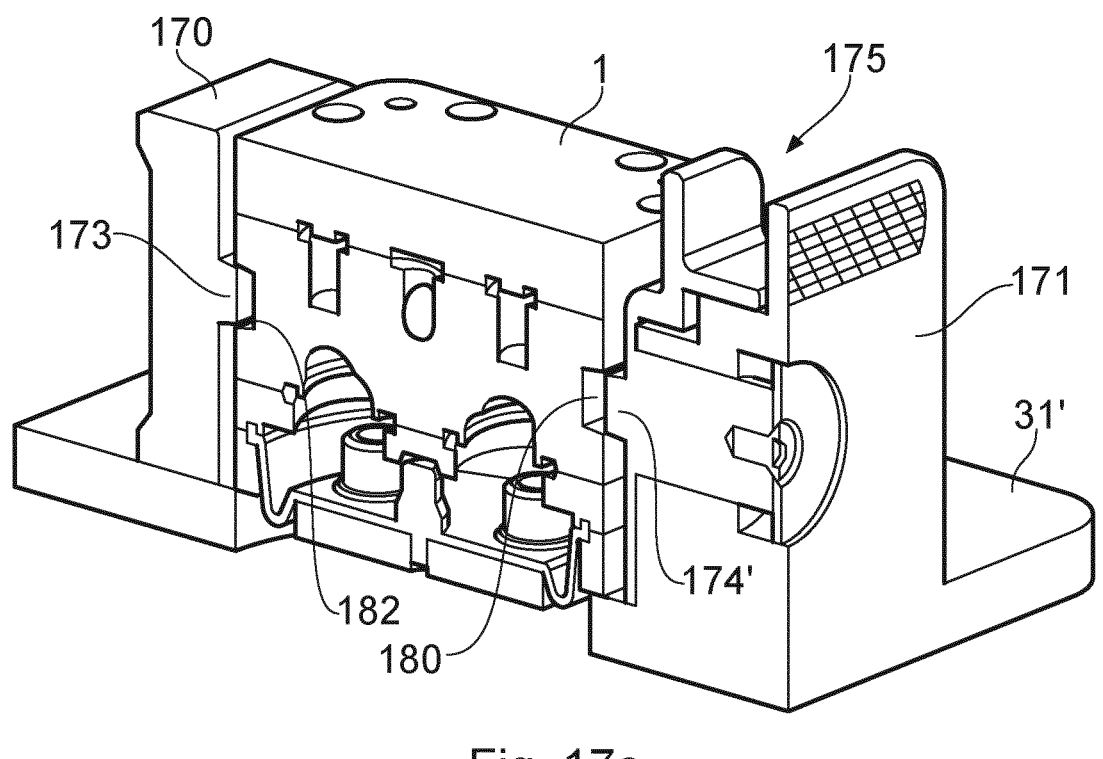
Figure 17D:
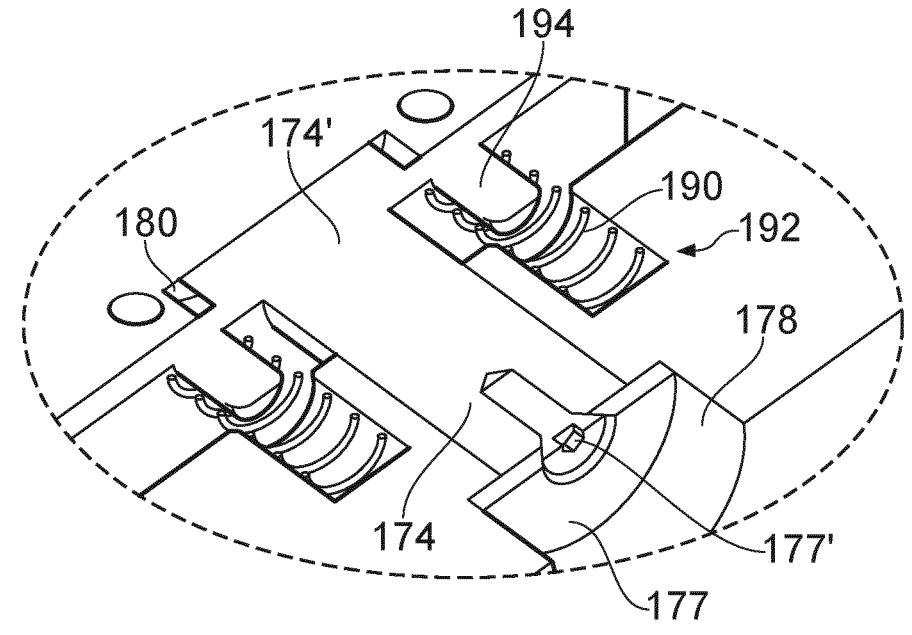
Figure 18A:
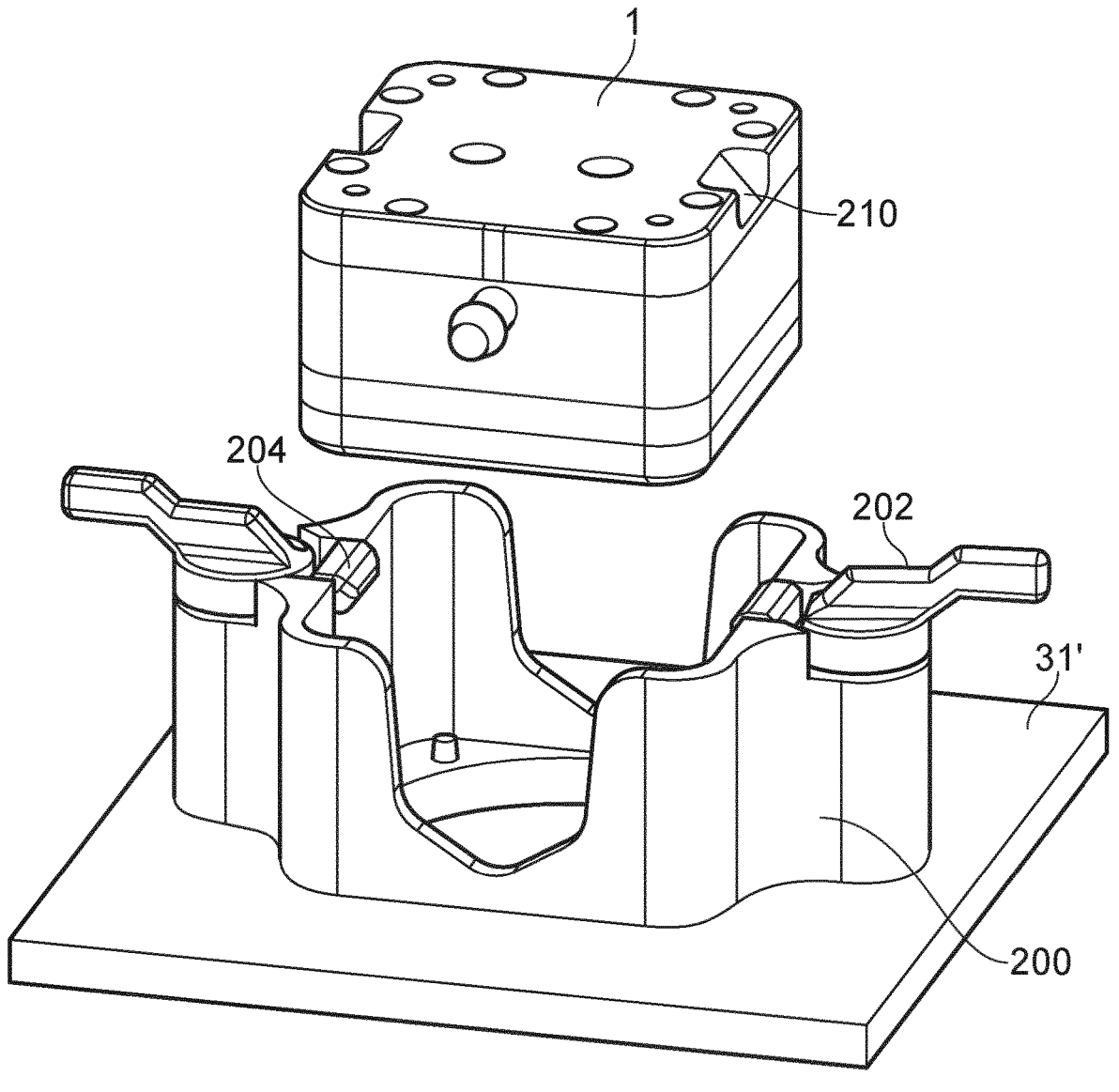
FIG. 18a-18f depict in various views a second example embodiment of a quick-connect fastener for removably fastening a pump head to a pump drive.
Figure 18B:
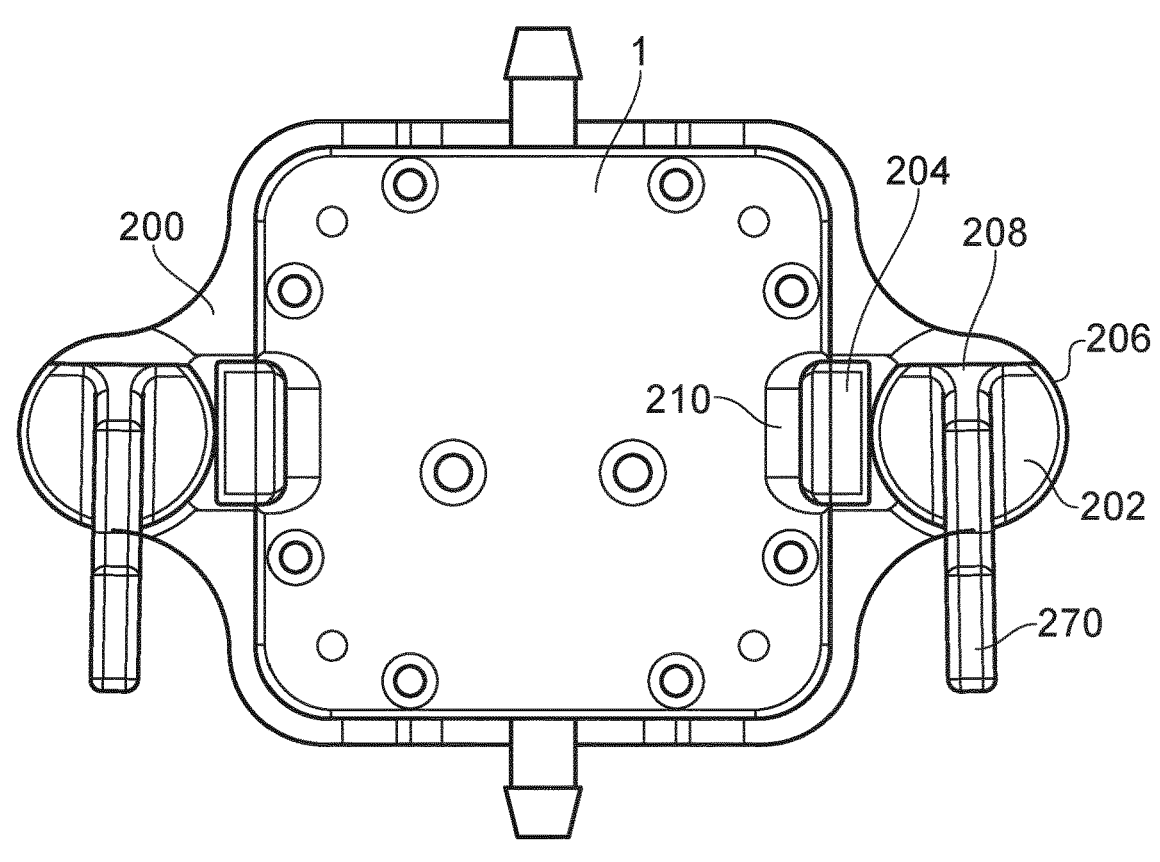
Figure 18C:
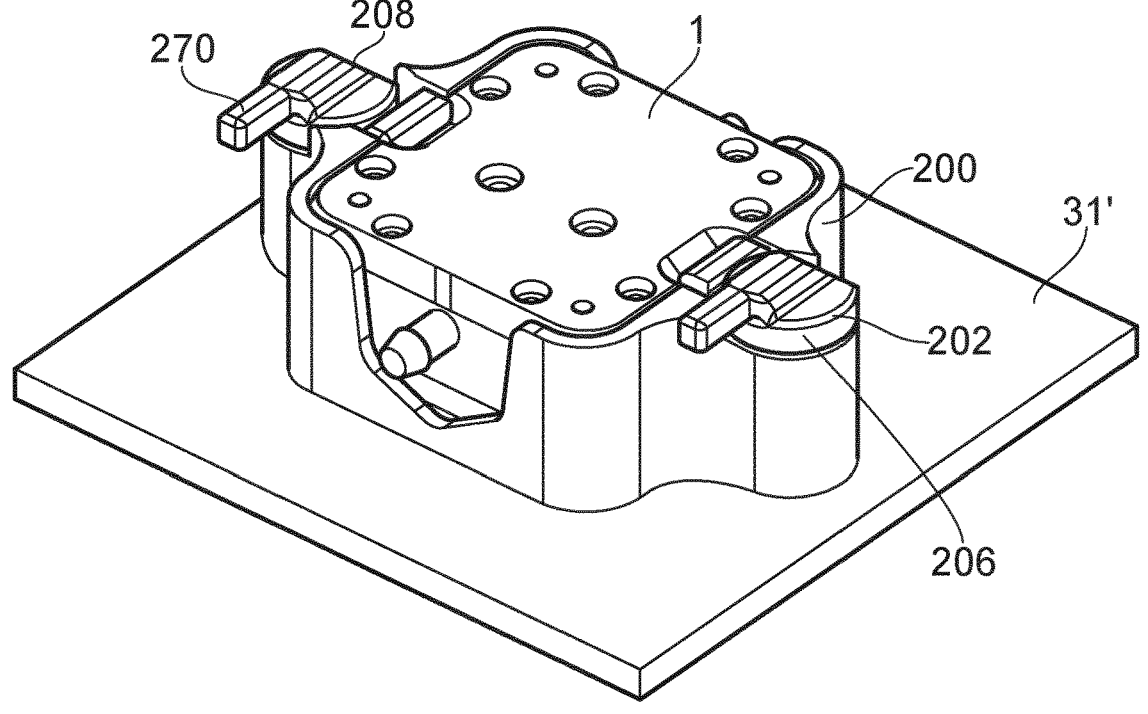
Figure 18D:
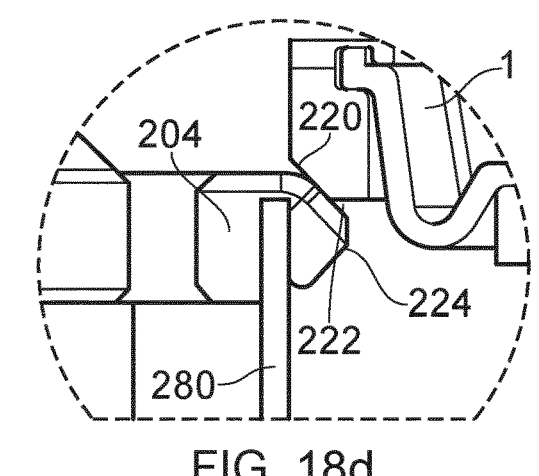
Figure 18E:
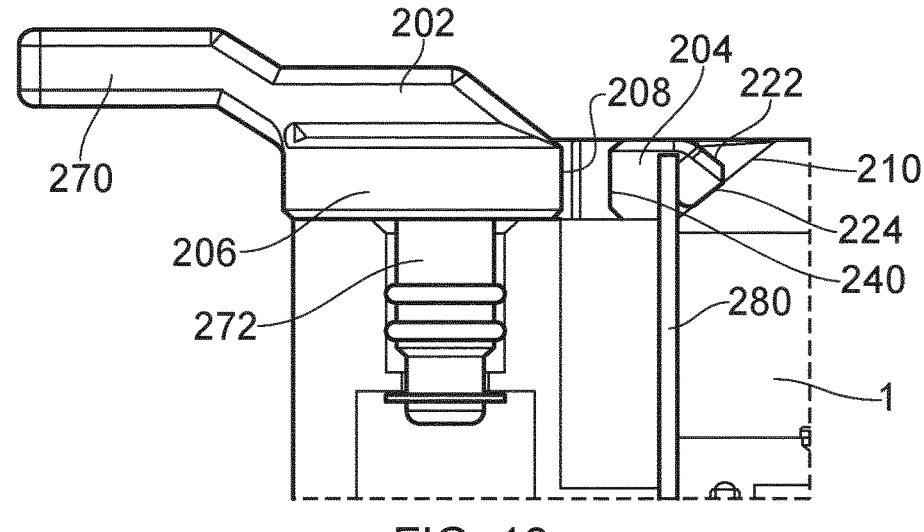
Figure 18F:
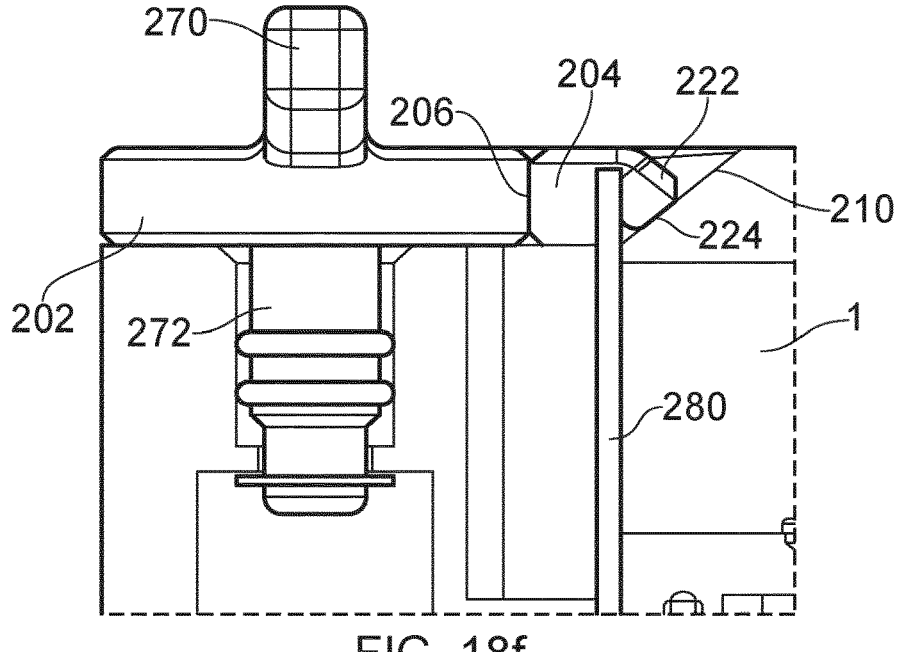
Figures 19A, 19B:
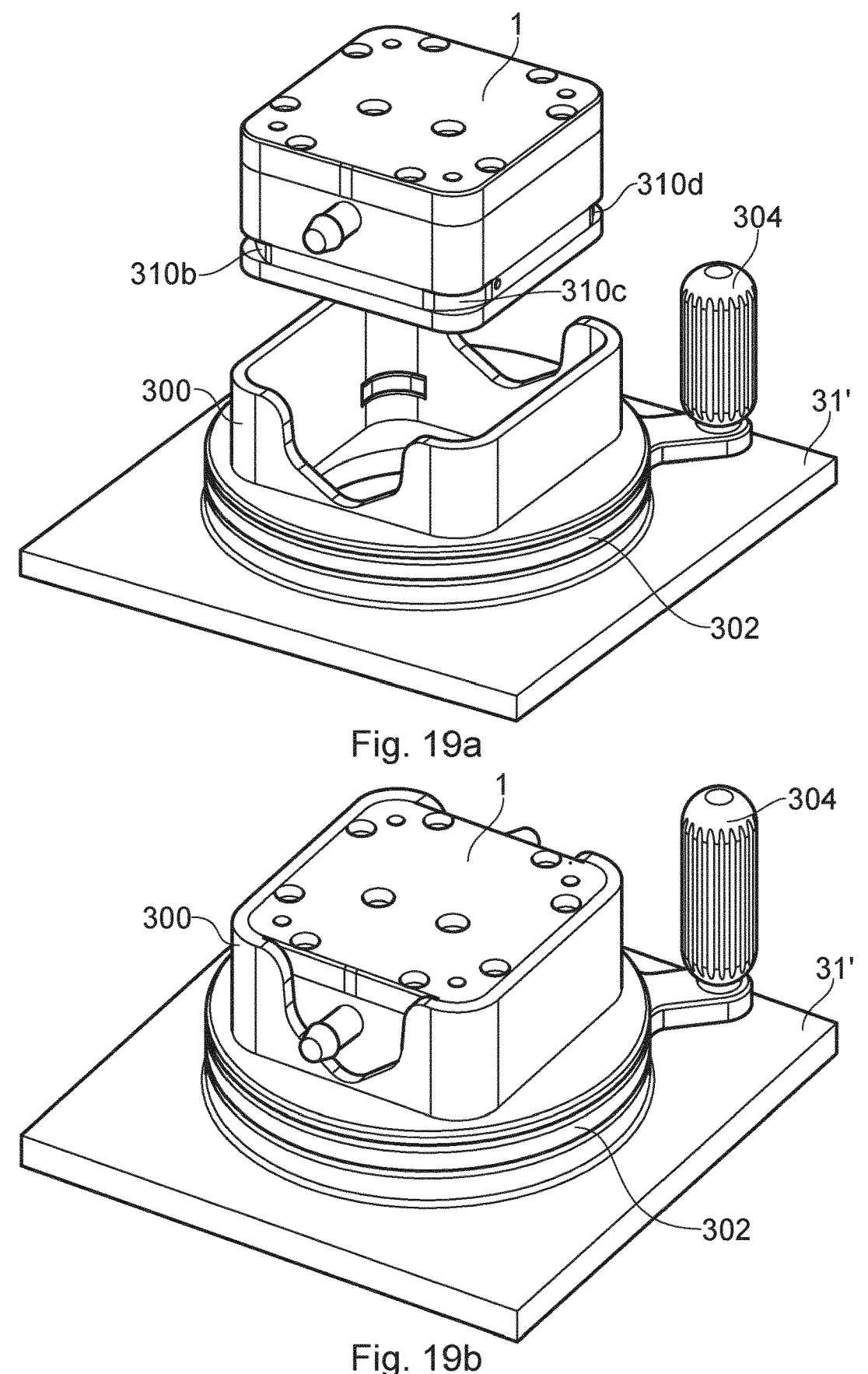
FIG. 19a-19h depict in various views a third example embodiment of a quick-connect fastener for removably fastening a pump head to a pump drive.
Figure 19C:
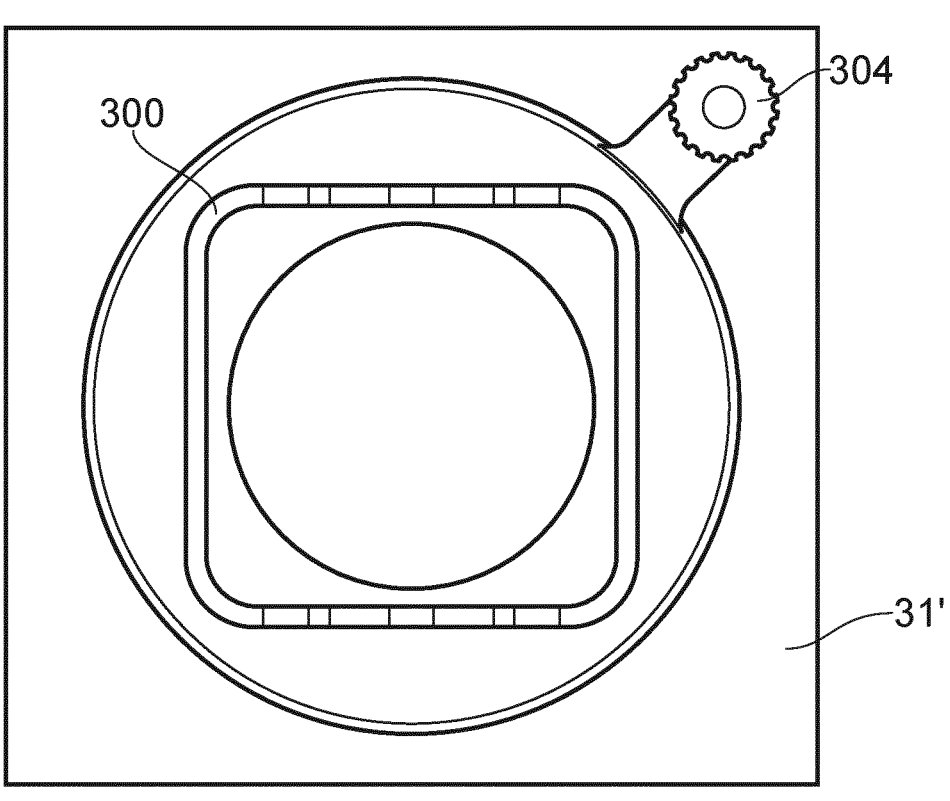
Figure 19D:
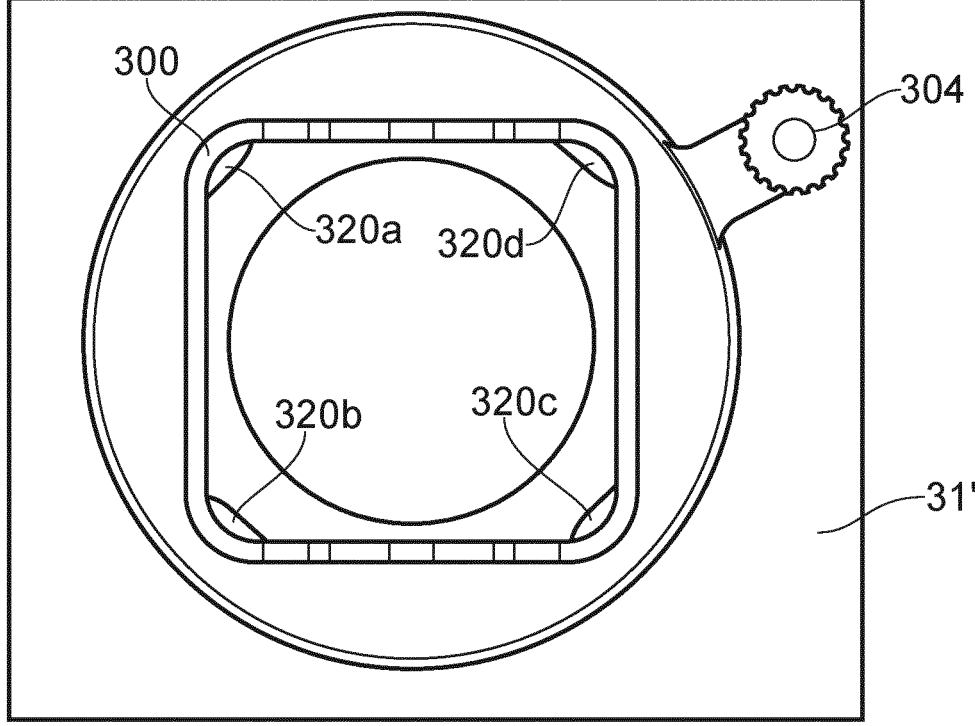
Figures 19E, 19F:
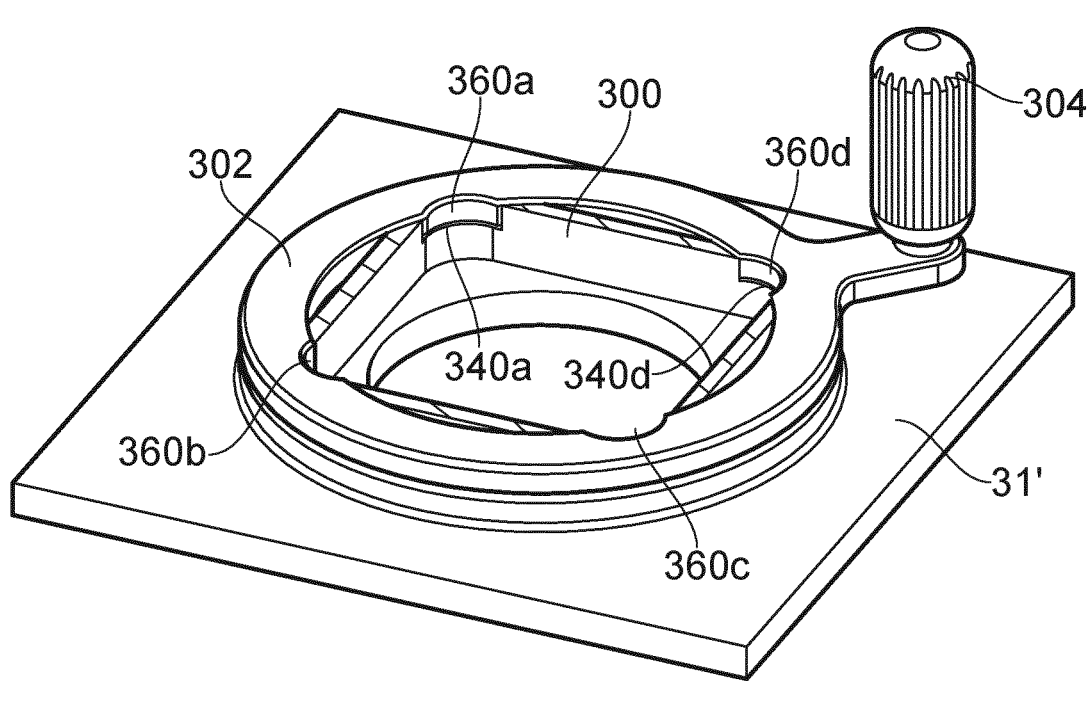
Figure 19G:
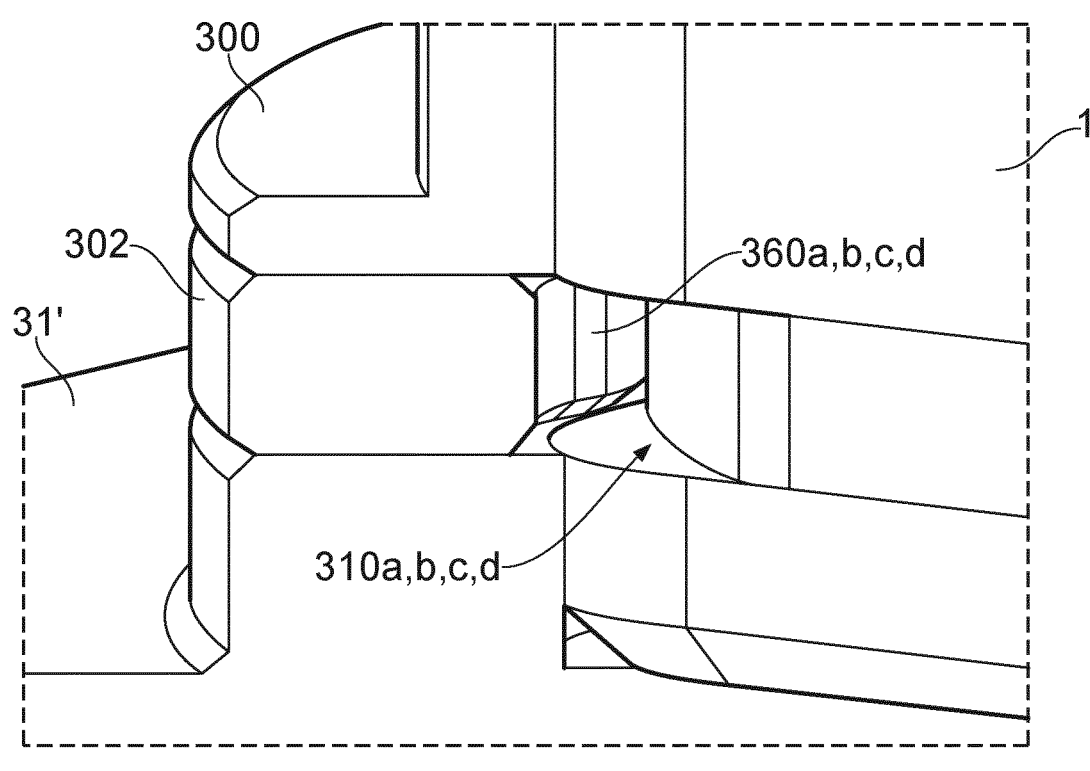
Figure 19H:
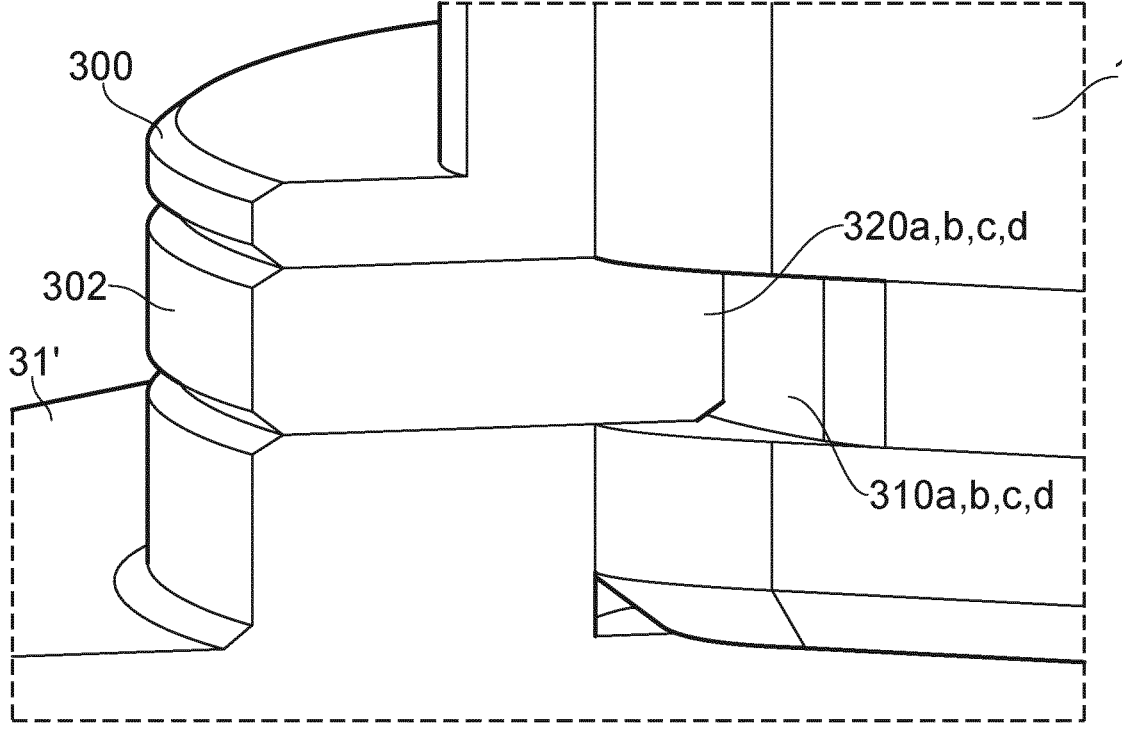

FIG. 17*b* depicts a cross sectional perspective view of the pump head 1 locked in said pump drive 31. FIG. 17*c* depicts a cross sectional perspective view of said pump head 1 released from said pump drive 31. In FIG. 17*c*, the first and second protrusions 173, 174' are released from the corresponding first and second recesses 182, 180. At least one spring 190 may be provided between said second element 171 and aid resilient member 175. Said at least one spring may be laterally secured onto said resilient member 175 by means of a spring protrusion 194 and laterally secured onto said second element by a spring recess 192. The spring recess 192 is configured to receive said spring and said spring protrusion 194.

FIG. 18*a*-18*f* depicts in various views a second example embodiment of a quick-connect fastener for removably fastening said pump head 1 to said pump drive 31. In this embodiment the pump head 1 is to be fixed in a support structure in the form of a frame 200 arranged on the top portion 31' of the pump drive 31. A resilient member 280 is attached to said frame 200. Said resilient member 280 has on its top end portion a stop member 204. The stop member 204 is configured to move laterally in an outward direction from a centre of said frame when a rotating cam member 202 is in an open position. Said rotating cam member 202 is in FIG. 18 shown to be a rotatable between an open position and locked position. In an open position there is no contact between said rotating cam member 202 and said stop member 204, a flat surface portion 208 of said rotating cam member 202 is facing towards a rear end 240 of said stop member 204. In a locked position there is contact between said rotating cam member 202 and said stop member 204, a cam portion 206 is facing towards the rear end 240 of said stop member 204. In the locked position the cam portion 206 of said rotating cam member 202 prohibits said stop member 204 from moving away from said pump head, i.e., a downwardly facing slanted surface 224 of said stop member 204 is attached to a corresponding upwardly facing slanted surface 210 of said pump head 1. In FIG. 18*a*-18*f* said upwardly facing slanted surface 210 of said pump head 1 is provided as a recess on the periphery of a top surface of said pump head. In various example embodiments the full periphery of said top surface may be slanted. The slanted surface is used for an easy removal of said pump head 1 from said pump drive 37 when said rotating cam member 202 is in its open position. Similarly, for an easy assembly of said pump head 1 onto said pump drive 37, a slanted periphery of a bottom surface 220 of said pump head 1 is configured for sliding against an upwardly facing slanted surface 222 of said stop member 204. Connection and disconnection of said pump head 1 to and from said pump drive 37 may only be made when said locking member is in its open position allowing said stop member 204 to move out of its position via said resilient member 280. The rotating cam member 202 may have a handle 270 for manually rotating said rotating cam member 202 between said locking and open position. The rotating cam member 202 may have a rotational axis 272 which is configured to be rotationally movable in a corresponding well provided in said frame 200. In various example embodiments said movement of said rotating cam member 202 may be accomplished by means of at least one electrical motor. In various example embodiments said stop member may be locked and unlocked by other means than the depicted rotating cam member 202, it may be a sliding bar provided in contact with the rear end 240 of said stop member 204 in locked position and removed away from said rear end 240 in open position. The locking means comprises the rotating cam member 202, the stop member 204 and the upwardly facing slanted surface 210.

FIG. 19a-19h depicts in various views a third example embodiment of a quick-connect fastener for removably fastening said pump head 1 to said pump drive 31. Similar to the embodiment in FIG. 18 the top portion 31' of the pump drive 31 comprising a support structure in the form of a frame 300 configured to receive the pump head 1. A rotatable ring 302 is configured for locking and unlocking said pump head 1 to said pump drive 31. The rotatable ring 302 has first inner sections 320a, 320b, 320c, 320d having a first inner diameter and second inner sections 360a, 360b, 360c, 360d with a second inner diameter. The first inner diameter is smaller than said second inner diameter. The second inner sections 360a, 360b, 360c, 360d may be evenly distributed around said ring 300. In FIGS. 19a, 19c, 19e and 19g said second inner sections 360a, 360b, 360c, 360d are aligned with corresponding recesses 340a, 340b, 340c, 340d in corners of said frame 300 allowing said pump head 1 to be attached to said pump drive 31. A rotation of said ring 302 from said open position to a locking position will move first inner sections 320a, 320b, 320c, 320d with a smaller inner diameter to slide into corresponding locking recesses 310a, 310b, 310c, 310d provided in corners of said pump head 1. The rotation of said ring 302 may be made manually by applying a tangential force with respect to said ring on a handle 304. In various alternative embodiments the rotation of said ring 302 may be made by at least one electrical motor. Locking means comprises said first inner sections 320a, 320b, 320c, 320d and said locking recesses 310a, 310b, 310c, 310d.

Figure 20A:
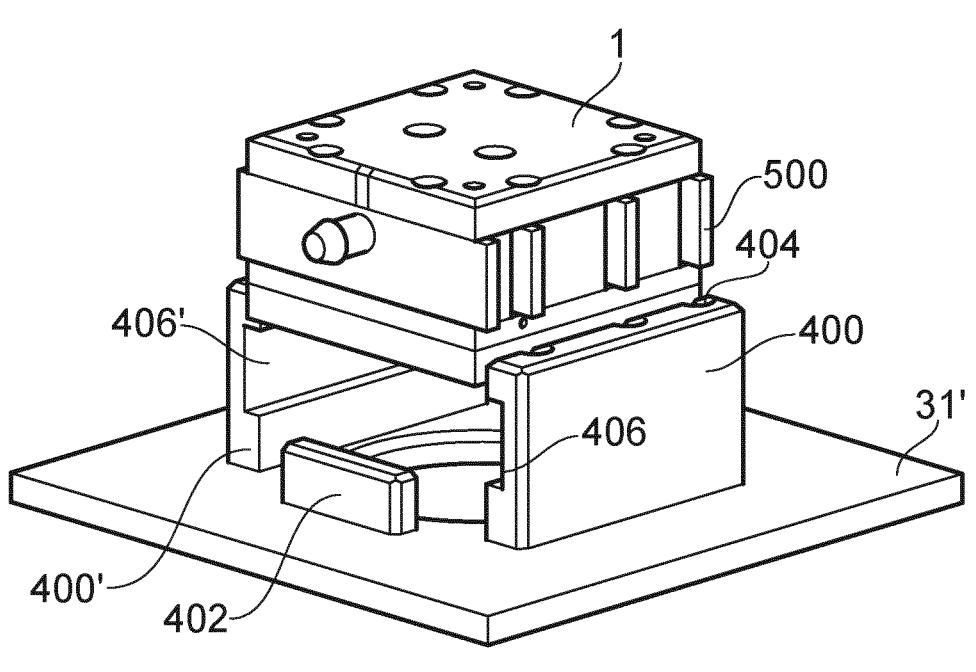
FIG. 20a-20h depict in various views a fourth example embodiment of a quick-connect fastener for removably fastening a pump head to a pump drive.
Figure 20B:
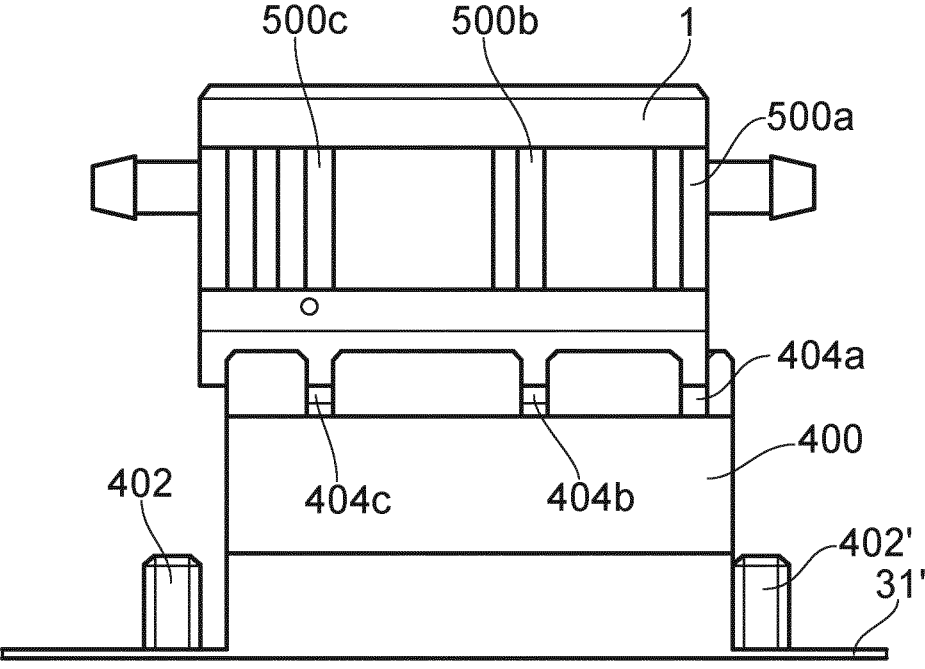
Figure 20C:
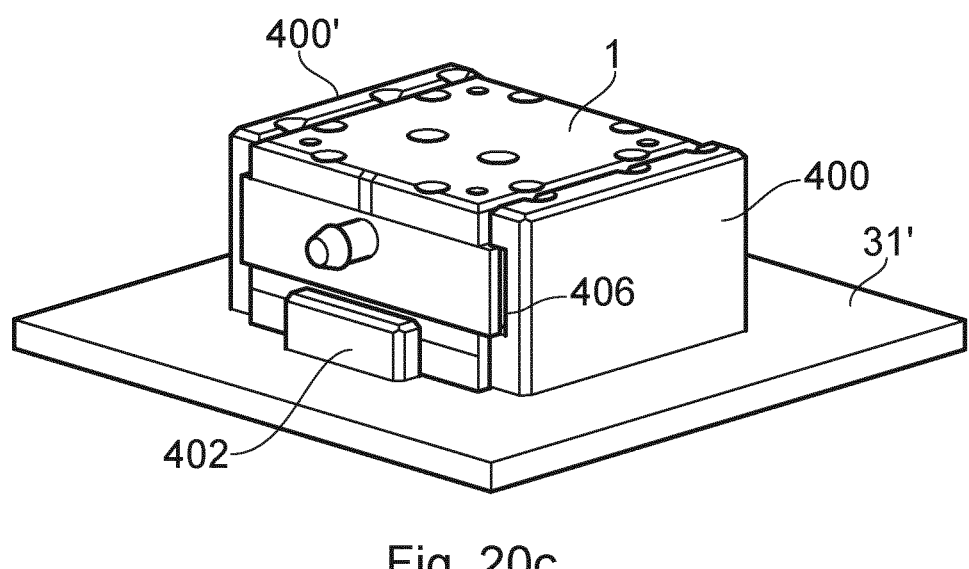
Figure 20D:
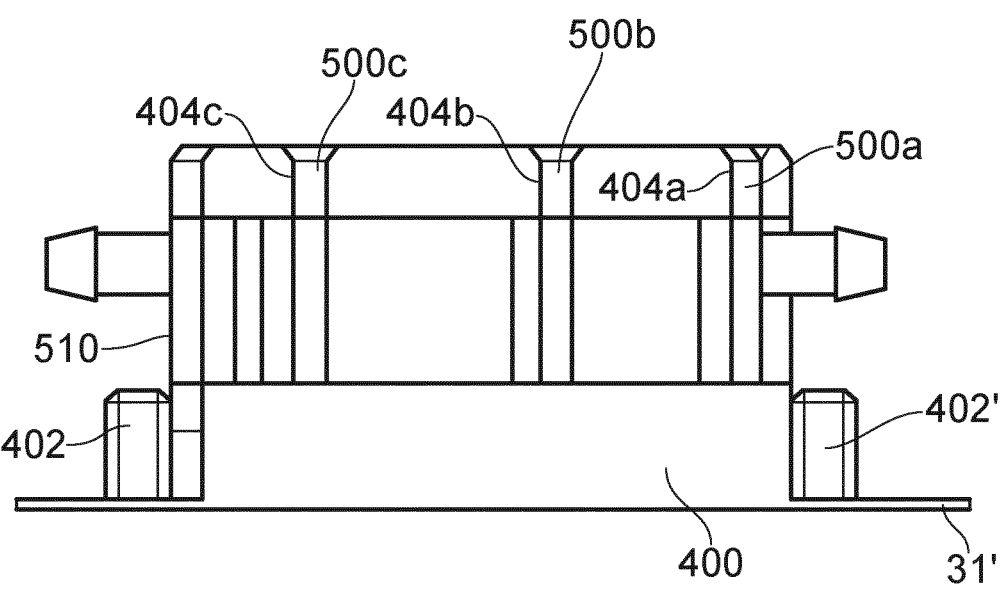
Figure 20E:
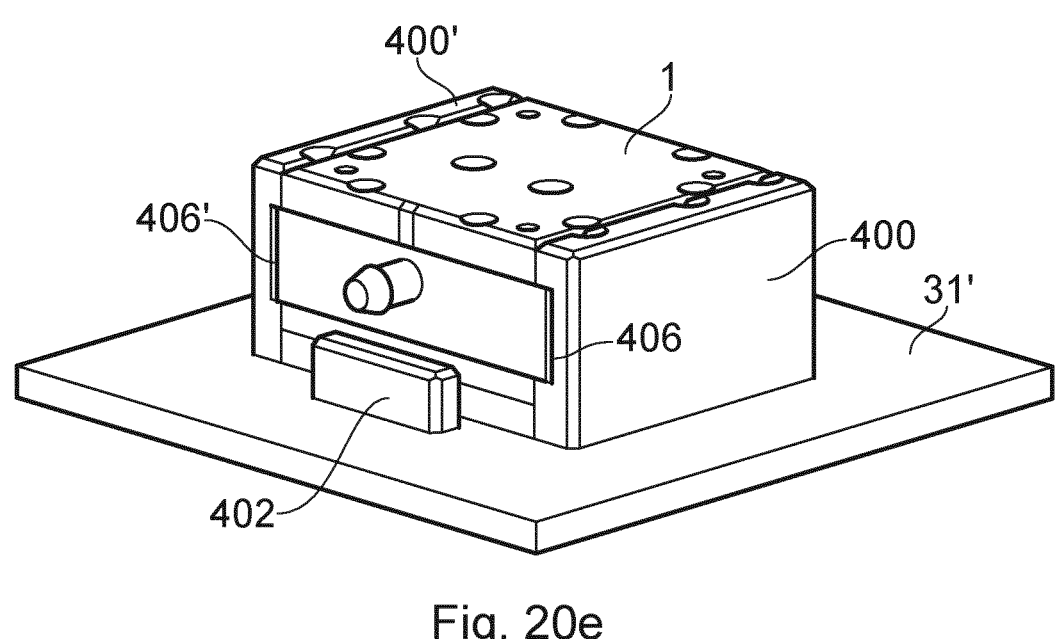
Figure 20F:
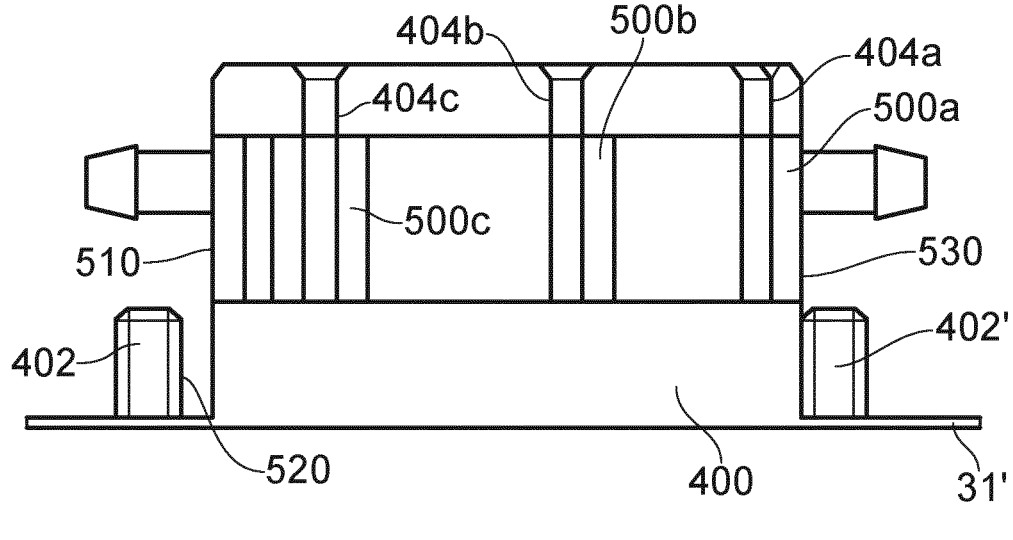
Figure 20G:
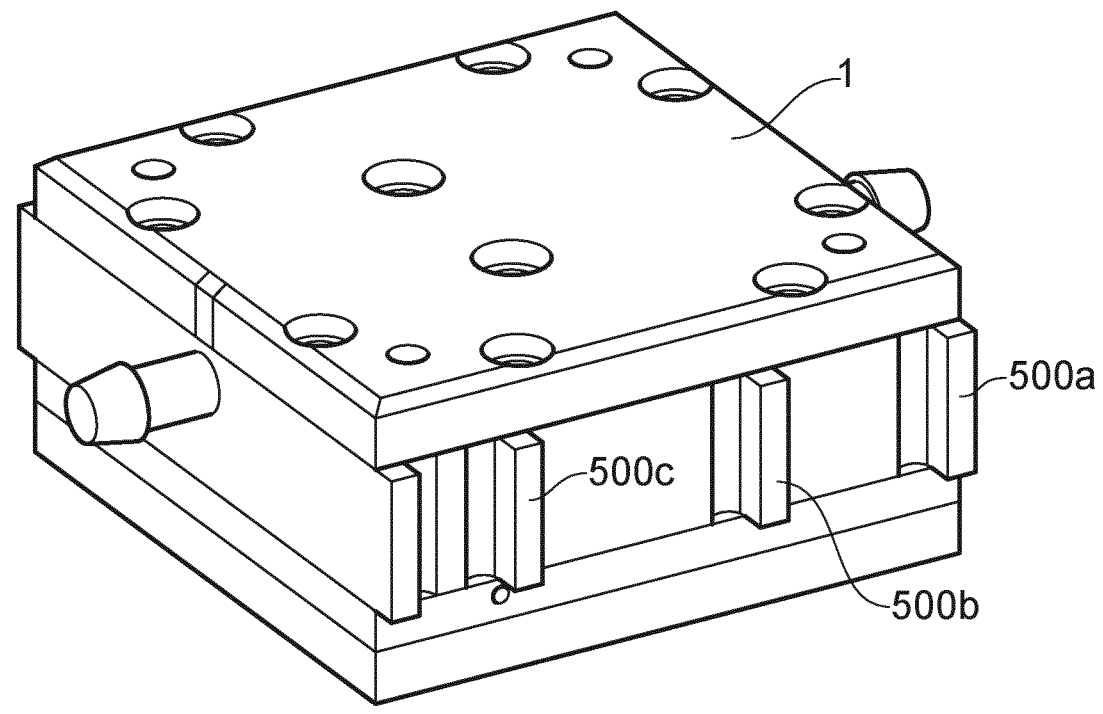
Figure 20H:
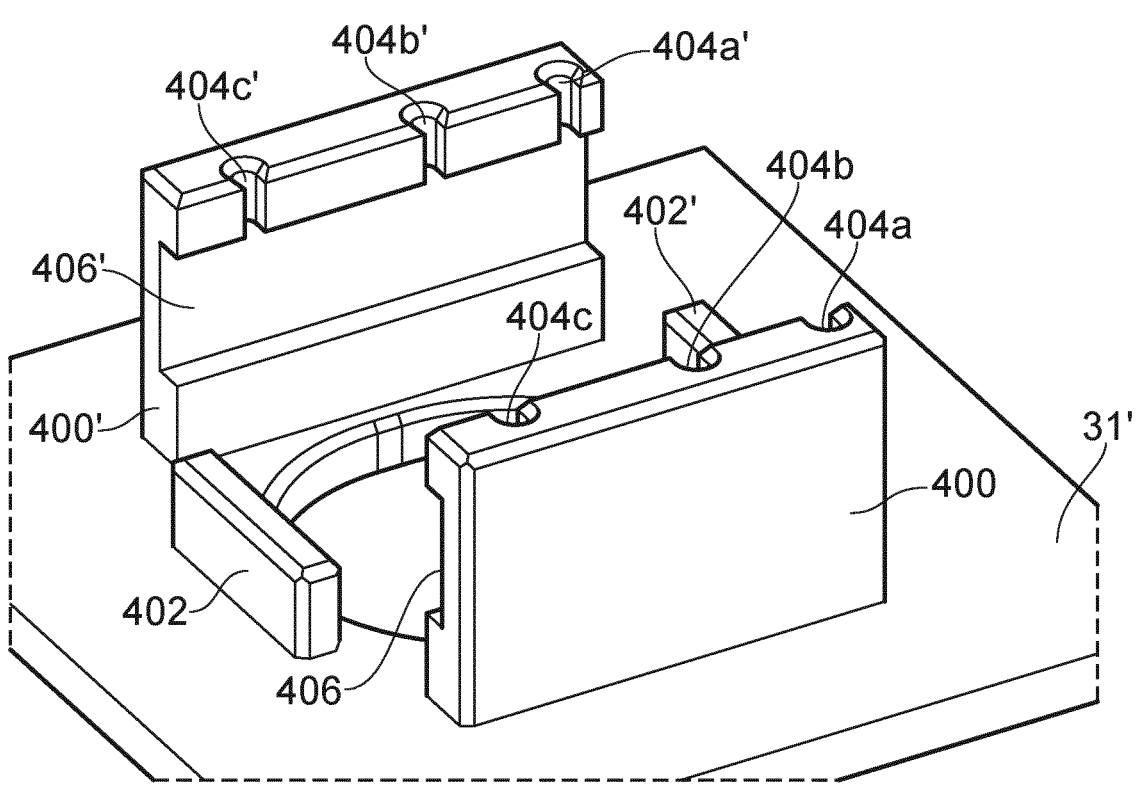
Figure 21A:
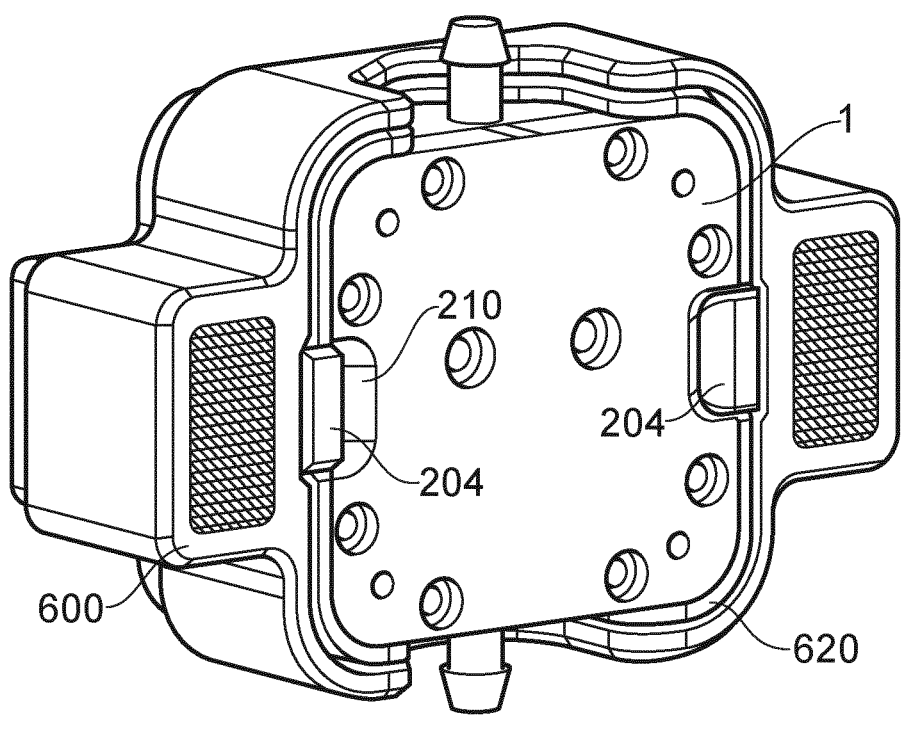
FIG. 21a-21g depict in various views a fifth example embodiment of a quick-connect fastener for removably fastening a pump head to a pump drive.
Figure 21B:
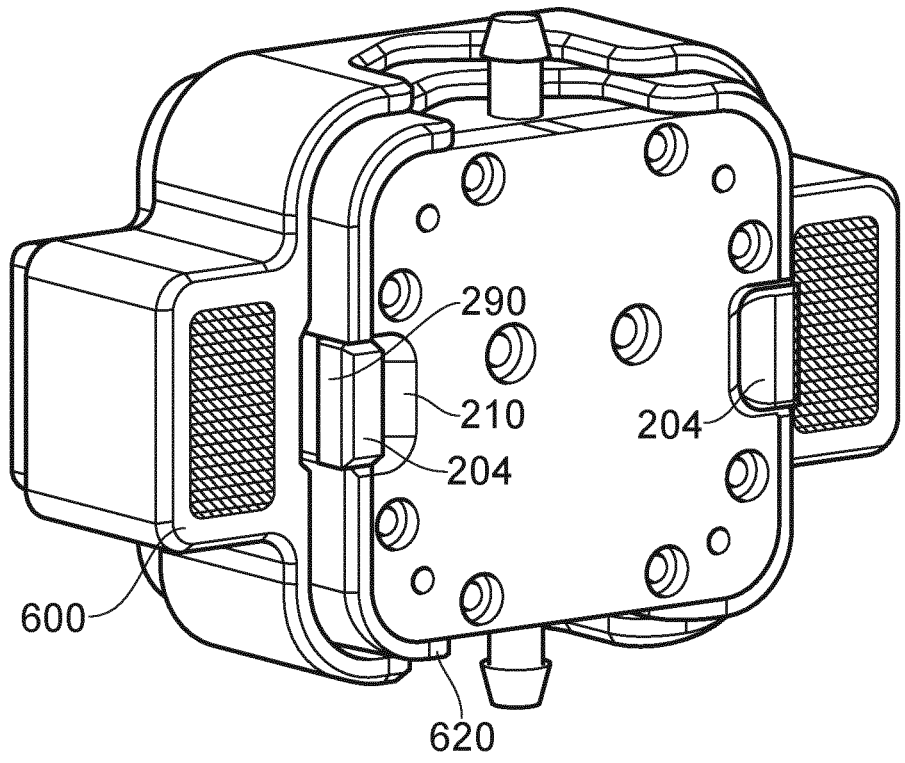
Figure 21C:
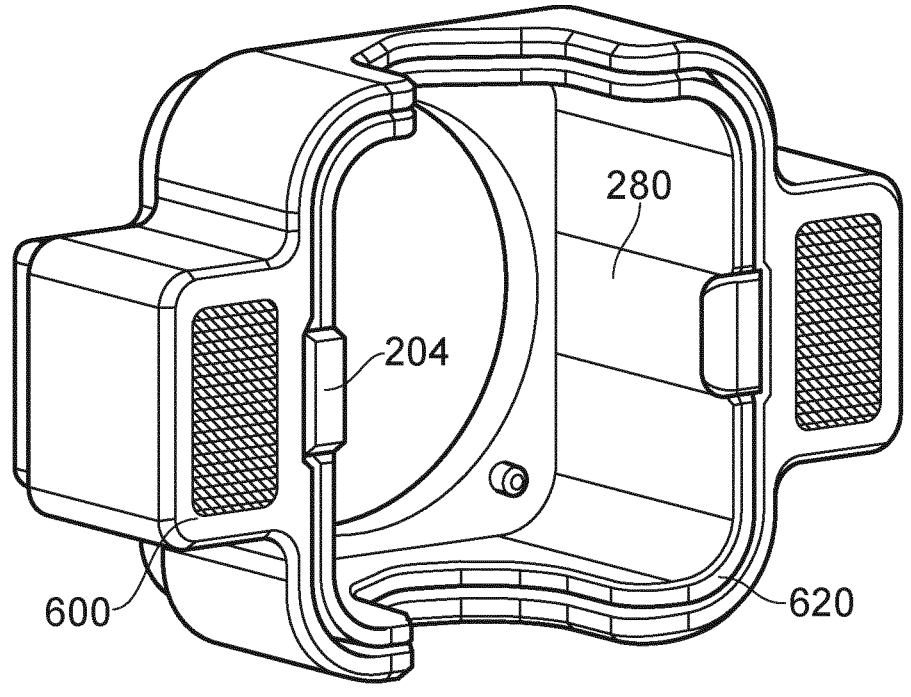
Figure 21D:
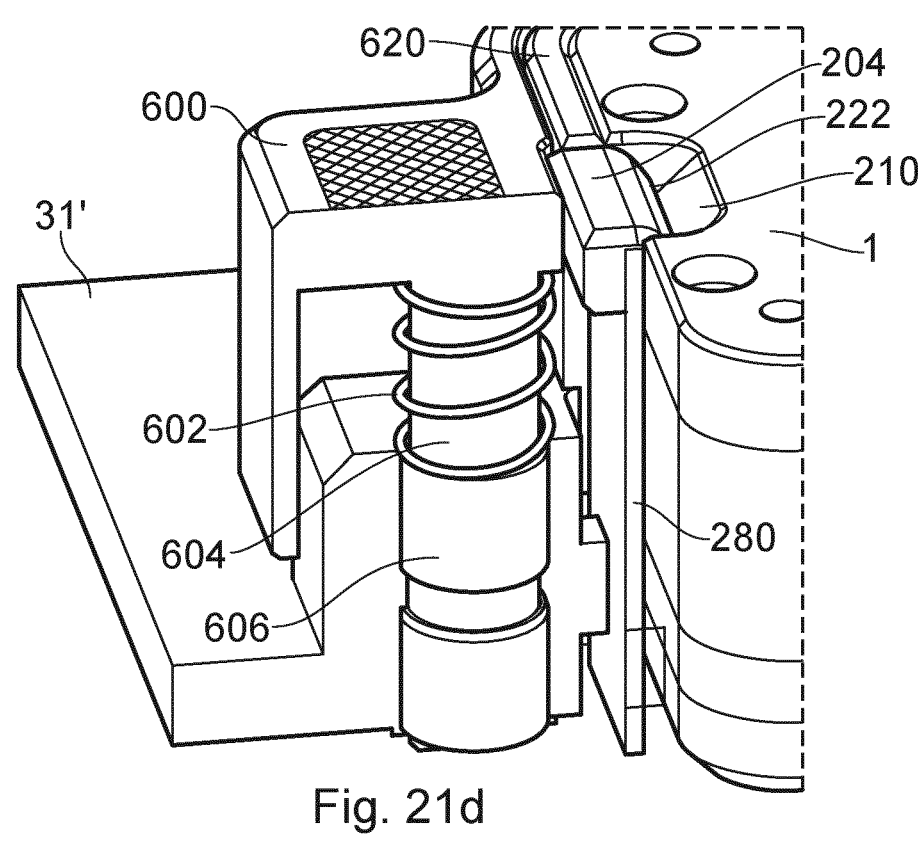
Figure 21E:
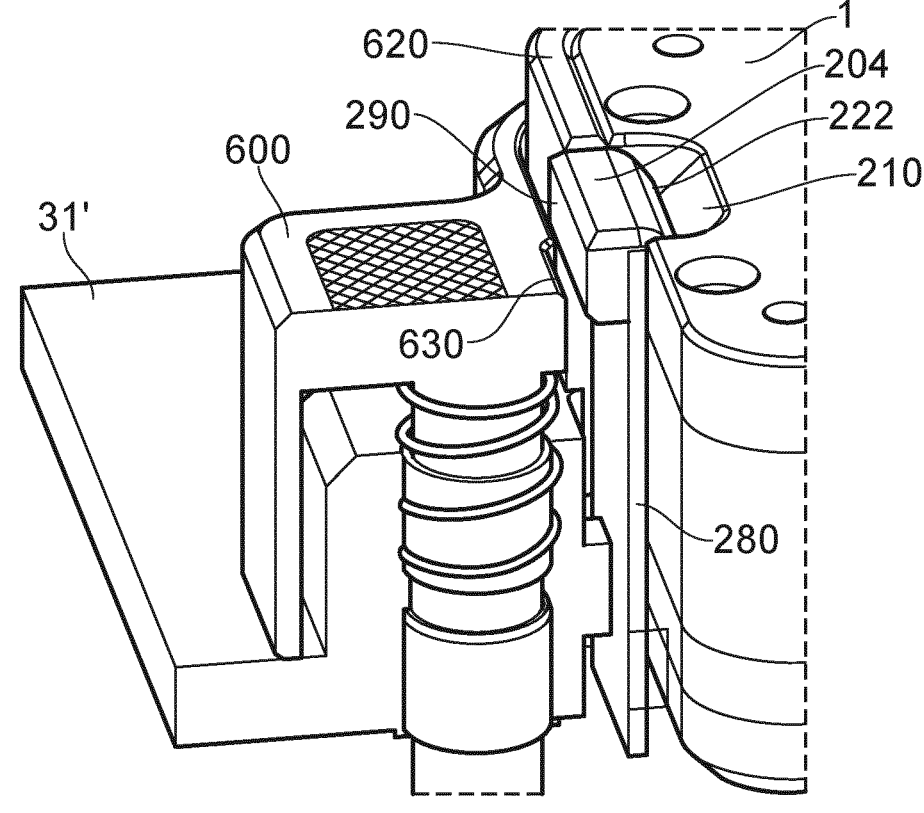
Figure 21F:
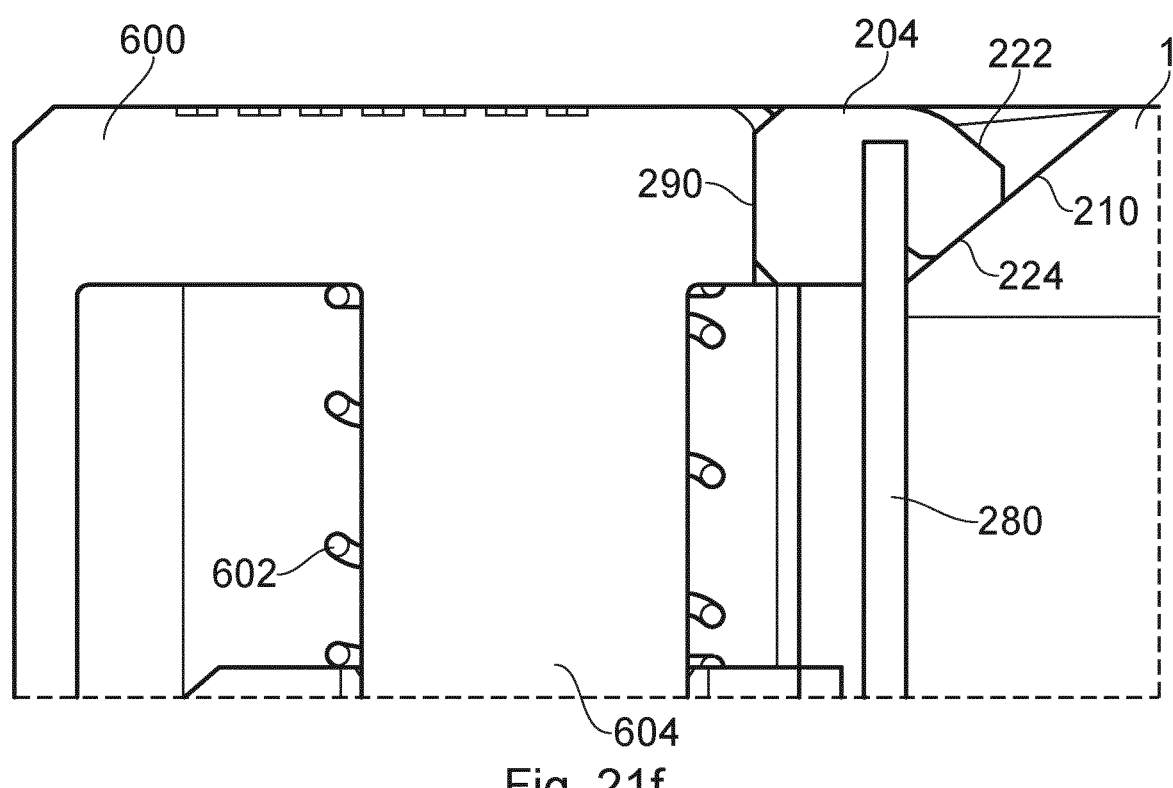
Figure 21G:
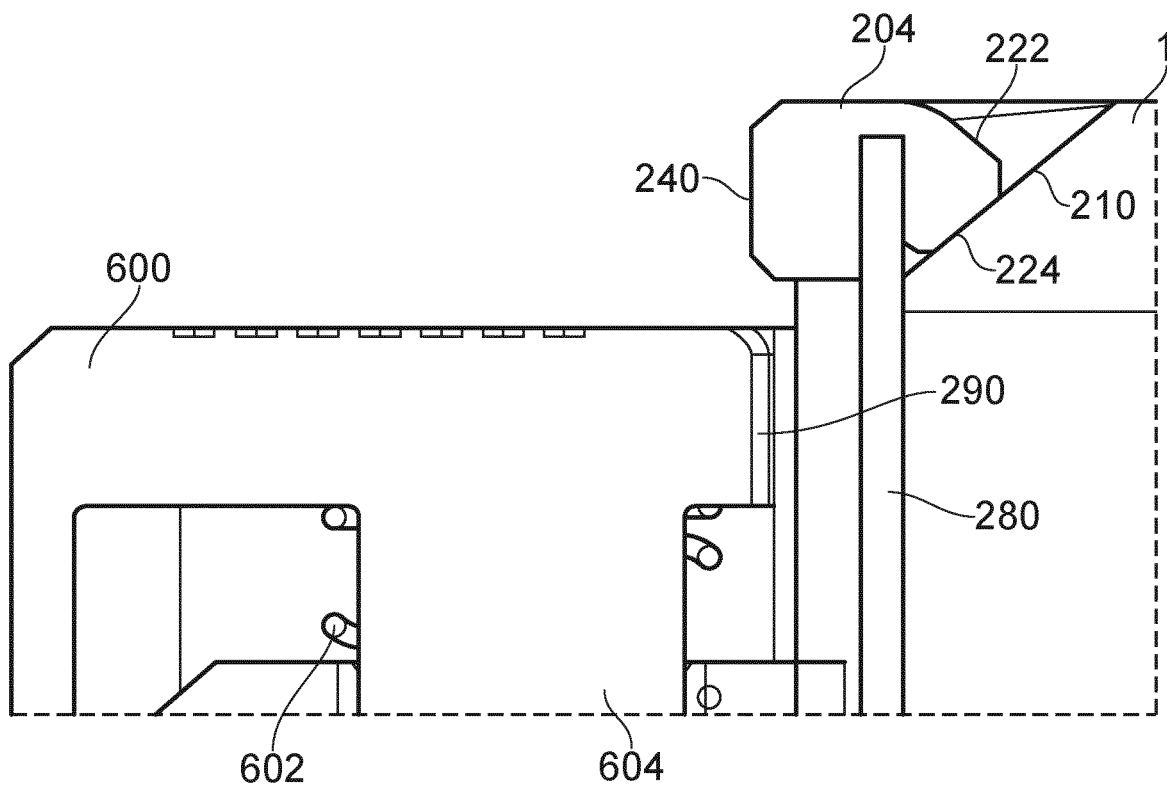

FIG. 20a-20h depicts in various views a fourth example embodiment of a quick-connect fastener for removably fastening said pump head 1 to said pump drive 31. A top portion 31' of said pump drive 31 comprises a first and second support structure 400 and 400' laterally spaced apart and configured for receiving said pump head 1. Said first and second element 400 and 400' are configured for restricting movement of said pump head 1 in a first opposing directions. Said top portion 31' further comprising a third and fourth support structure 402, 402' laterally spaced apart and configured for receiving said pump head 1. Said third and fourth support structure 402, 402' are configured for restricting movement of said pump head 1 in a second opposing directions, which second directions are perpendicular to said first directions. At least one of said first and second support structure 400, 400' comprises at least one vertical recess 404a, 404b, 404c configured to receive a corresponding vertical protrusion 500a, 500b, 500c arranged on said pump head 1. In FIG. 20c the pump head 1 is attached to said pump drive 31 but in an unlocked position. In the unlocked position a front surface 510 of said pump head 1 may be contacting said third support structure 402. By sliding said pump head 1 towards said fourth support structure 402' said pump head will be in a locked position. In said locked position a rear end 530 of said pump head 1 may be contacting said fourth support structure 402'. When said rear end 530 of said pump head 1 is contacting said fourth support structure the at least one recess 404a, 404b, 404c in said first and second support structure 400 and 400' respectively is not aligned with the protrusions 500a, 500b, 500c on said pump head 1 making a removal of said pump head 1 from said pump drive 31 impossible. To disassembly said pump head 1 from said pump drive 31 is performed by sliding said pump head 1 towards said third support structure 402 so that said that said front surface 510 of said pump head 1 is contacting said third support structure 402. When said front surface 510 of said pump head 1 is contacting said third support structure 402 the protrusions 500a, 500b, 500c are aligned with corresponding recesses 404a, 404b, 404c in said first and 404a', 404b', 404c' in said second support structure 400, 400'. A first sliding recess 406 in said first support structure 400 is configured for receiving said protrusions 500a, 500b, 500c and allowing a movement of said pump head 1 back and forth from said third support structure and said fourth support structure 402'. Similarly, a second sliding recess 406' in said second support structure 400' is configured for receiving said protrusions 500a', 500b', 500c' (not shown) and allowing a movement of said pump head 1 back and forth from said third support structure 402 and said fourth support structure 402'. Locking means comprises said protrusions 500a, 500b, 500c, 500a', 500b', 500c', said recesses 404, 40b, 404c, 404a' 404b', 404c' and said sliding recesses 406, 406'.

FIG. 21a-21g depicts in various views a fifth example embodiment of a quick-connect fastener for removably fastening said pump head 1 to said pump drive 31. Similarly to the second embodiment as depicted in FIG. 18, the pump head 1 is to be fixed in support structure in the form of a frame 600 arranged on the top portion 31' of the pump drive 31.

A resilient member 280 is attached to said frame 620. Said resilient member 280 has on its top end portion a stop member 204. The stop member 204 is configured to move laterally in an outward direction from a centre of said frame 620 when a depressible member 600 is in an open position. Said depressible member 600 is in FIG. 21 shown to be depressible between an open position and locked position. In an open position, when said depressible member is depressed, there is no contact between said depressible member 600 and said stop member 204. In the open position a blocking surface 240 is laterally spaced from corresponding blocking surface 290 of said stop member 204. In a locked position there is contact between said blocking surface 240 of said depressible member 600 and said blocking surface 290 of said stop member 204. In the locked position the pump head 1 is prohibited to be moved away from said pump drive 31, i.e., a downwardly facing slanted surface 224 of said stop member 204 is attached to a corresponding upwardly facing slanted surface 210 of said pump head 1.

In FIG. 21d-21g said upwardly facing slanted surface 210 of said pump head 1 is provided as a recess on the periphery of a top surface of said pump head. In various example embodiments the full periphery of said top surface may be slanted. The slanted surface is used for an easy removal of said pump head 1 from said pump drive 31 when said depressible member 600 is in its open position. Similarly, for an easy assembly of said pump head 1 onto said pump drive 31, a slanted periphery of a bottom surface (not shown) of said pump head 1 is configured for sliding against an upwardly facing slanted surface 222 of said stop member 204. Connection and disconnection of said pump head 1 to and from said pump drive 31 may only be made when said depressible member 600 is in its open position allowing said stop member 204 to move out of its position via said resilient member 280. The depressible member 202 may have an axis 604 which is configured to be movable in a corresponding well 606 provided in said frame 620. A spring 602 is arranged between the frame 620 and said depressible member 600. In various example embodiments said movement of said depressible member 600 may be accomplished by means of at least one electrical motor. Locking means comprises said depressible member 600, said stop member 204 and said upwardly facing slanted surface 210.

The improved arrangement shown in the figures addresses various problems associated with the prior art, in particular, the improved arrangement is more compact, has less chance of trapping air, which improves cleanability, and provides flow with low pulsation across a relatively wide flow and pressure range.

It will be apparent to the skilled addressee that additions, omissions and modifications are possible to the embodiments described above without departing from the scope of the invention claimed.

The invention claimed is:

1. A diaphragm pump for a bioprocess system comprising:
   a pump head comprising:
      a common inlet;
      a common outlet;
      a plurality of pump cavities each including at least one cooperating pair of one-way valves, the at least one pair of one-way valves including an inlet valve and an outlet valve, wherein the respective inlet valves are in fluid communication with the common inlet and the respective outlet valves are in fluid communication with the common outlet and wherein a centre of the outlet valve for each pump cavity is positionable above a centre of the inlet valve for the same pump cavity when the diaphragm pump is oriented for use to inhibit trapped gas;
      a plurality of moveable diaphragms each respectively provided in a respective of said pump cavities for varying a volume of the pump cavities; and
      at least one leakage collector configured to collect possible leakage from the plurality of pump cavities; and
   a pump drive which is configured to transfer a motion to the diaphragms of the pump head for accomplishing a fluid displacement from the common inlet to the common outlet of the pump head as a result of said varying of the volume of the pump cavities,
   wherein the inlet and outlet valves include flexible valve disks, each disk including a generally central retaining stem for holding the valve disk in place, wherein the inlet and outlet valves comprise an outer sealing area of said flexible valve disks configured to seal against at least a portion of a corresponding valve seat in said pump head, and wherein said outer sealing area is made of a first material which is softer than a second material in the remaining part of the inlet and outlet valves; and
   wherein the leakage collector is a vessel positioned within the pump head and below the plurality of pump cavities, and comprises a leak sensor at a low end thereof to detect leakage.

2. The diaphragm pump according to claim 1, wherein said inlet and outlet valves further comprise said first softer material in a valve stem sealing area configured to seal against at least a portion of a corresponding valve sealing surface in said pump head.

3. The diaphragm pump according to claim 2, wherein said softer material in said outer sealing area of said flexible valve disk and/or said valve stem sealing area of said flexible valve disk is applied as a layer having a predetermined thickness onto at least a portion of a core comprising said second material.

4. The diaphragm pump according to claim 1, wherein at least a portion of said valve stem has a frustoconical shape.

5. The diaphragm pump according to claim 1, wherein said moveable diaphragm comprises a reinforcement layer and an elastomer layer.

6. The diaphragm pump according to claim 5, wherein said reinforcement layer is embedded in said elastomer layer.

7. The diaphragm pump according to claim 5, wherein said reinforcement layer comprises a web structure made of fabric or elastomer material having less elasticity compared to the elastomer layer.

8. The diaphragm pump according to claim 6, wherein said elastomer layer is oriented to contact a liquid-containing portion of said diaphragm pump.

9. The diaphragm pump according to claim 1, wherein the pump head further comprises a pivot device provided at a centre of a diaphragm engagement plate of the pump head for providing a pivot point at the centre of the diaphragm engagement plate.

10. The diaphragm pump according to claim 1, wherein the at least one leakage collector comprises a flexible bellow surrounding the pump cavities and diaphragms.

11. The diaphragm pump according to claim 1, wherein the pump drive comprises a rotating drive shaft and a wobble plate which is connected at an inclined angle to the drive shaft via a bearing, wherein the wobble plate is configured for connection to the pump head for transferring a movement from the rotating drive shaft to the diaphragms.

12. The diaphragm pump according to claim 11, wherein the pump drive is configured to apply an active modulation of the pump speed over the rotation of the drive shaft for compensating for pulsation of the pump.

13. The diaphragm pump according to claim 1, wherein the pump head comprises three or five pump cavities which are radially distributed around a centre of the pump head.

14. The diaphragm pump according to claim 1, wherein a diaphragm engagement plate of the pump head and a wobble plate of the pump drive comprises cooperating connection features provided for avoiding rotational friction forces between the diaphragm engagement plate and the wobble plate.

15. The diaphragm pump according to claim 1, wherein the pump head is a single use pump head and the pump drive is reusable.

16. The diaphragm pump according to claim 1, wherein the pump head provides a closed compartment without seals and is produced from a plurality of plastic layers connected by diffusion bonding, said closed compartment comprising at least the inlet and outlet valves and the diaphragms as integrated elastomeric functional components.

17. The diaphragm pump according to claim 1, further comprising a quick-connect fastener for removably fastening said pump head to said pump drive.

18. The diaphragm pump according to claim 17, wherein said quick-connect fastener is operable between a locked position in which said pump head is locked to said pump drive and an unlocked position in which said pump head is releasable and removable from said pump drive.

19. The diaphragm pump according to claim 1, wherein said pump drive comprises at least one support structure for restricting the movement of said pump head, when attached to said pump drive, in at least one direction.

20. The diaphragm pump according to claim 17, wherein at least one locking means is movably attached to said pump drive.

21. A bioprocess system comprising a diaphragm pump according to claim 1.

22. A one-way valve configured to be used in a diaphragm pump according to claim 1, said one-way valve comprising an outer sealing area of a flexible valve disks configured to seal against at least a portion of a corresponding valve seat in a pump head of said diaphragm pump, said outer sealing area is made of a first material which is softer than a second material in the remaining part of the one-way valve.

23. The one-way valve according to claim 22, wherein said one way valve also comprises said first softer material in a valve stem sealing area configured to seal against at least a portion of a corresponding valve sealing surface in said pump head.

24. The one way valve according to claim 23, wherein said softer material in said outer sealing area of said flexible valve disk and/or said valve stem sealing area of said flexible valve disk is provided as a layer having a predetermined thickness onto at least a portion of a core having said second material.

25. The one-way valve according to claim 22, wherein at least a portion of a valve stem of said one-way valve has a frustoconical shape.

26. A movable diaphragm configured to be used in a diaphragm pump according to claim 1, wherein said moveable diaphragm comprises a reinforcement layer and an elastomer layer.

27. The movable diaphragm according to claim 26, wherein said reinforcement layer is embedded in said elastomer layer.

28. The movable diaphragm according to claim 26, wherein said reinforcement layer comprises a web structure made of fabric or elastomer material having less elasticity compared to the elastomer layer.

29. The movable diaphragm according to claim 26, wherein said elastomer layer is configured to contact a liquid within said diaphragm pump.

30. A quick-connect fastener configured to be used in a diaphragm pump according to claim 1 for removably fastening said pump head to said pump drive, wherein at least one locking means arranged on said pump drive is movable with respect to said pump drive for locking said pump head to said pump drive.

31. The quick-connect fastener according to claim 30, wherein at least one locking means is rotatable.

32. The quick-connect fastener according to claim 30, wherein at least one locking means is resilient.

33. The quick connect fastener according to claim 32, further comprising at least one means for restricting a movement of said resilient locking me.

34. A pump head which is configured to be used connected to a pump drive of a diaphragm pump for a bioprocess system, said pump head comprising:
a common inlet;

a common outlet;
a plurality of pump cavities each including at least one cooperating pair of one-way valves, the at least one pair including an inlet valve and an outlet valve, wherein the respective inlet valves are in fluid communication with the common inlet and the respective outlet valves are in fluid communication with the common outlet and wherein a centre of the outlet valve for each pump cavity is positionable above a centre of the inlet valve for the same pump cavity when the diaphragm pump is oriented for use to inhibit trapped gas;
respective moveable diaphragms provided in said pump cavities for varying a volume of the pump cavities; and
at least one leakage collector configured to collect possible leakage from the pump cavities, wherein the at least one leakage collector is a vessel positioned within the pump head and below the plurality of pump cavities, and comprises a leak sensor at a low end thereof to detect leakage.

35. The pump head according to claim 34, wherein the inlet and outlet valves include flexible valve disks, each disk including a generally central retaining stem for holding the valve disk in place.

36. The pump head according to claim 34, wherein the pump head further comprises a pivot device provided at a centre of a diaphragm engagement plate of the pump head for providing a pivot point at the centre of the diaphragm engagement plate.

37. The pump head according to claim 34, wherein the at least one leakage collector comprises a flexible bellow surrounding the pump cavities and diaphragms.

38. The pump head according to claim 34, wherein the pump head comprises three or five pump cavities which are radially distributed around a centre of the pump head.

39. The pump head according to claim 34, wherein the pump head is a single use pump head.

40. The pump head according to claim 34, wherein the pump head provides a closed compartment without seals produced from a plurality of plastic layers connected by diffusion bonding, and wherein said closed compartment comprises at least the inlet and outlet valves and the diaphragms as integrated elastomeric functional components therein.

41. The pump head according to claim 34, further comprising a quick-connect fastener for removably fastening said pump head to said pump drive.

42. The pump head according to claim 41, wherein said quick connect fastener is operable between a locked position in which said pump head is locked to said pump drive and an unlocked position in which said pump head is releasable and removable from said pump drive.

43. A single use flow path assembly for a bioprocess system, comprising a pump head according to claim 40 connected to a single use flow path.

44. The single use flow path assembly according to claim 43, wherein said flow path assembly is pre-sterilized.

* * * * *